(12) United States Patent
Beer et al.

(10) Patent No.: US 11,536,835 B2
(45) Date of Patent: Dec. 27, 2022

(54) LASER MEASURING MEANS FOR MEASURING A DISTANCE FROM AN OBJECT, AND METHOD OF OPERATING SAME

(71) Applicant: Fraunhofer-Gesellschaft zur Foerderung der angewandten Forschung e.V., Munich (DE)

(72) Inventors: Maik Beer, Duisburg (DE); Olaf Schrey, Duisburg (DE); Werner Brockherde, Duisburg (DE); Bedrich Hosticka, Duisburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 741 days.

(21) Appl. No.: 16/423,868

(22) Filed: May 28, 2019

(65) Prior Publication Data
US 2019/0369248 A1    Dec. 5, 2019

(30) Foreign Application Priority Data
May 30, 2018   (DE) .................. 10 2018 208 647.8

(51) Int. Cl.
| | | |
|---|---|---|
| *G01S 17/00* | (2020.01) | |
| *G01S 17/10* | (2020.01) | |
| *G01S 7/4865* | (2020.01) | |

(52) U.S. Cl.
CPC ............ *G01S 17/10* (2013.01); *G01S 7/4865* (2013.01)

(58) Field of Classification Search
USPC ...................................................... 356/5.01
See application file for complete search history.

(56) References Cited

U.S. PATENT DOCUMENTS

| 10,845,467 B2 * | 11/2020 | Axelsson ............... G01S 17/10 |
| 11,067,674 B2 * | 7/2021 | Schrey ................. G01S 7/4876 |

(Continued)

FOREIGN PATENT DOCUMENTS

| CN | 103464906 A | 12/2013 |
| CN | 104301707 A | 1/2015 |

(Continued)

OTHER PUBLICATIONS

Beer, Maik et al., "Coincidence in SPAD-based time-of-flight sensors", in 2017 13th Conference on Ph.D. Research in Microelectronics and Electronics (PRIME), 2017, pp. 381-384, 2017, pp. 381-384.

(Continued)

*Primary Examiner* — James R Hulka

(74) *Attorney, Agent, or Firm* — Perkins Cole LLP; Michael A. Glenn

(57) ABSTRACT

A laser measuring set for measuring a distance from an object includes a pulse laser for emitting a laser pulse at the beginning of a measuring cycle; an optical sensor having at least one detection unit for generating detection signals; a coincidence recognition stage for generating coincidence signals, wherein during the measuring cycle, one of the coincidence signals is generated each time the detection signals generated by the detection unit reach at least a preset coincidence depth within a coincidence time; a coincidence time presetting stage for presetting the coincidence time for the coincidence recognition stage, the coincidence time presetting stage being configured such that the coincidence time monotonically increases during the measuring cycle;

(Continued)

and travel-time measuring set for determining the distance on the basis of a travel-time measurement of the coincidence signals.

15 Claims, 16 Drawing Sheets

(56) References Cited

U.S. PATENT DOCUMENTS

| | | | |
|---|---|---|---|
| 2013/0250273 A1* | 9/2013 | Ludwig | G01S 17/10 356/4.07 |
| 2014/0021356 A1* | 1/2014 | Zwaans | G01T 1/2985 250/362 |
| 2014/0183357 A1 | 7/2014 | Smith et al. | |
| 2015/0041625 A1* | 2/2015 | Dutton | G01T 1/2985 341/166 |
| 2015/0338270 A1* | 11/2015 | Williams | G01J 1/18 250/214.1 |
| 2015/0364635 A1* | 12/2015 | Bodlovic | H01L 31/024 250/214.1 |
| 2017/0234973 A1* | 8/2017 | Axelsson | G01S 17/894 356/5.01 |
| 2017/0299717 A1 | 10/2017 | Hallek | |
| 2018/0156895 A1 | 6/2018 | Hinderling et al. | |
| 2018/0231646 A1* | 8/2018 | Schrey | G01S 7/4863 |
| 2019/0277952 A1 | 9/2019 | Beuschel et al. | |

FOREIGN PATENT DOCUMENTS

| | | |
|---|---|---|
| CN | 104833979 A | 8/2015 |
| CN | 104870986 A | 8/2015 |
| CN | 105043539 A | 11/2015 |
| CN | 105824027 A | 8/2016 |
| CN | 106405570 A | 2/2017 |
| CN | 106683168 A | 5/2017 |
| CN | 106796292 A | 5/2017 |
| CN | 108089193 A | 5/2018 |
| DE | 102018203533 A1 | 9/2019 |
| DE | 102018203534 A1 | 9/2019 |
| EP | 3537172 A1 | 9/2019 |

OTHER PUBLICATIONS

Hayat, Majeed M. et al., "Theory of photon coincidence statistics in photon-correlated beams", Opt. Commun., vol. 169, No. 1-6, pp. 275-287, Oct. 1999, pp. 275-287.

Seitz, Peter et al., "Part 1 of 2: Single-photon imaging", Heidelberg; New York: Springer, 2011.

Seitz, Peter et al., "Part 2 of 2: Single-photon imaging", Heidelberg; New York: Springer, 2011.

* cited by examiner

LASER MEASURING MEANS FOR MEASURING A DISTANCE FROM AN OBJECT, AND METHOD OF OPERATING SAME

CROSS-REFERENCE TO RELATED APPLICATION

This application claims priority from German Patent Application No. DE 10 2018 208 647.8, which was filed on May 30, 2018, and is incorporated herein in its entirety by reference.

The invention relates to a laser measuring means for measuring a distance from an object, said laser measuring means operating in accordance with a time-of-flight method. In addition, the invention relates to a method of operating such a laser measuring means. Within this context, one speaks of light detection and ranging (LIDAR).

BACKGROUND OF THE INVENTION

With known laser measuring means operating in accordance with a time-of-flight method, the time of flight (travel time) of a laser pulse emitted from an active radiation source and reflected by the object to be measured is measured by detecting the reflected laser pulse.

Within this context, known laser measuring means operating in accordance with a time-of-flight method exhibit the disadvantage that as the distance and the background light increase, the reflected laser pulse becomes increasingly difficult to distinguish from the background light, so that the quality of the distance measurements decreases.

SUMMARY

According to an embodiment, a laser measuring set for measuring a distance from an object may have: a pulse laser for emitting a laser pulse at the beginning of a measuring cycle; an optical sensor including at least one detection unit for generating detection signals, the detection unit including at least one detector for detecting individual photons, the detection unit generating one of the detection signals, during the measuring cycle, each time one of the photons is detected by the detector; a coincidence recognition stage for generating coincidence signals, wherein during the measuring cycle, one of the coincidence signals is generated each time the detection signals generated by the detection unit reach at least a preset coincidence depth within a coincidence time; a coincidence time presetting stage for presetting the coincidence time for the coincidence recognition stage, the coincidence time presetting stage being configured such that the coincidence time monotonically increases during the measuring cycle; and travel-time measuring set for determining the distance on the basis of a travel-time measurement of the coincidence signals.

According to another embodiment, a method of operating a laser measuring set for measuring a distance from an object may have the steps of: emitting a laser pulse at the beginning of a measuring cycle by means of a pulse laser; generating detection signals by means of at least one detection unit of an optical sensor, the detection unit including at least one detector for detecting individual photons, wherein during the measuring cycle, one of the detection signals is generated by the detection unit each time one of the photons is detected by the detector; generating coincidence signals by means of a coincidence recognition stage, wherein during the measuring cycle, one of the coincidence signals is generated each time the detection signals generated by the detection unit reach at least a preset coincidence depth within a coincidence time; presetting the coincidence time for the coincidence recognition stage by a coincidence time presetting stage, the coincidence time being preset such that the coincidence time monotonically increases during the measuring cycle; and determining the distance by means of a travel-time measuring set on the basis of a travel-time measurement of the coincidence signals.

According to another embodiment, a non-transitory digital storage medium may have a computer program stored thereon to perform the inventive method, when said computer program is run by a computer.

The laser measuring means serves to sense a distance from an object in a contactless manner.

The pulse laser may be an infrared pulse laser, in particular. The measuring cycle starts by emitting a laser pulse and ends, at the latest, with the start of a subsequent measuring cycle, i.e., when a new laser pulse is emitted. The duration of the measuring cycle corresponds to the maximum travel time of the laser pulse at which it is still possible to detect photons of the laser pulse.

The optical sensor may be an integrated CMOS sensor wherein the detection unit is fully arranged on a single semiconductor chip. The detection unit may also be distributed across various semiconductor chips, however. In addition, the detection unit may also comprise discrete components. The optical sensor may be an integrated 3D hybrid sensor manufactured by means of wafer-to-wafer, chip-to-wafer, or chip-to-chip bonding.

Any detector capable of detecting a single photon within the wavelength range of the pulse laser may be used as the detector. The detector may be an avalanche diode, in particular a single-photon avalanche diode (SPAD). Single-photon avalanche diodes (SPADs) are avalanche diodes operated above their respective avalanche voltages. Within said so-called Geiger range, one single photon, which is absorbed within the active range of the diode and generates a free charge carrier, is sufficient for resulting in a breakdown of the diode and, thus, in a macroscopic current flow through the diode. Thus, SPADs enable detection of individual photons. However, the detector may also be a silicon photomultiplier (SiPM).

The coincidence recognition stage processes further the detection signals of precisely one detection unit. This means that when several detection units are provided, several coincidence recognition states will be provided. The coincidence recognition stage outputs a coincidence signal precisely when at least a predefined number of detection signals are received from the associated detection unit within a coincidence time period. The predefined number is referred to as the coincidence depth within this context. What is achieved by this, at least when the coincidence depth is >1, is that a single detection signal, which is generated due to a photon originating from the background light, will not result in performing a (faulty) travel-time measurement. Background light within this context is any light that does not originate from the pulse laser of the laser measuring means.

The distance may then be measured on the basis of a travel-time measurement of the coincidence signals, which are more reliable than the detection signals.

Within this context, provision is made for the coincidence time presetting stage to preset the coincidence time in a variable manner, so that the coincidence time monotonically increases during the measuring cycle. Monotonically increasing here means that the coincidence time increases during the measuring cycle and will be at least as large, at each point in time during the measuring cycle, as it was at the previous points in time of the measuring cycle. Due to the monotonic increase of the coincidence time, variable sensitivity of the reception side of the laser measuring means is effected within the measuring cycle, the sensitivity increasing as time goes on. This is achieved by variable attenuation, which is higher at the beginning of the measuring cycle than at the end of the measuring cycle.

With short distances, or short travel times, increased attenuation ensures reduced probability of faulty measurements due to the background light. Since with short distances, the reflected laser pulse has a high intensity due to its inversely square dependence, the increased attenuation only has a marginal influence on the precision of the measurement within the close range. With larger distances, or longer travel times, attenuation is reduced so as to enable improved detection of the reflected laser pulse. In this manner, the method enables improvement of the measurement at larger distances, or longer travel times, without any significant deterioration within the close range.

This results in an improvement in the measurement accuracy at large distances and/or with bright background light because of distance-dependent adaptation of signal evaluation.

The invention may be employed, in particular, when precise and reliable determination of relatively large distances is indispensable. For example, the inventive laser measuring means is suitable for emergency braking systems in land vehicles since there, distances from foreign objects are advantageously recognized reliably in real time so as to be able to predict possible motions of foreign objects in time, so that collisions may be prevented by means of corresponding interventions in the control of the respective land vehicle. However, the invention is useful also with other driver assistance systems. Likewise, the invention is suitable for autonomous vehicles, i.e., for vehicles running without drivers. Further fields of application are aviation and medical technology.

In accordance with an advantageous further development of the invention, the laser measuring means comprises a background event rate determining stage for determining a background event rate of the detection signals, the coincidence time presetting stage being configured for presetting the coincidence time while taking into account the background event rate.

The background event rate indicates the number of detection signals per time unit which are exclusively generated by detecting photons originating from the background light. The background event rate may be determined by temporarily switching off the pulse laser and by counting, while the pulse laser is switched off, the number of detection signals which are nevertheless received within a specific time period. Within this context, provision may be made for the coincidence time to be reduced when the background event rate increases.

By presetting the coincidence time while taking into account the background event rate, the quality of the measurements of the distances may be further improved.

In accordance with one further development of the invention, the coincidence time presetting stage is configured to preset the coincidence time while taking into account the preset coincidence depth. Within this context, provision may be made for the coincidence time to be extended when the coincidence depth is increased.

By presetting the coincidence time while taking into account the preset coincidence depth, the quality of the measurements of the distances may be further improved.

In accordance with an advantageous further development of the invention, the laser measuring means comprises a maximum value determining stage for determining a maximum value of a constant probability density function for the occurrence of a first coincidence signal of the coincidence signals when exclusively considering the background event rate of the detection signals at the preset coincidence depth, the coincidence time presetting stage being configured to preset the coincidence time while taking into account the maximum value. The probability density function for the occurrence of a first coincidence signal of the coincidence signals when exclusively considering the background event rate of the detection signals is constant when it exhibits a constant value for the entire measuring cycle. Within this context, a constant probability density function results in a quality of the measurements of the distances which is independent of the travel time. The higher the constant value of the probability density function, the higher the quality will be. The maximum value is that constant value which the constant probability density function may adopt at a maximum. The maximum value may be calculated as a function of the coincidence depth and of the background event rate.

By presetting the coincidence time while taking into account the maximum value, the quality of the measurements of the distances may be further improved.

In accordance with an advantageous further development of the invention, the laser measuring means comprises a background event rate determining stage for determining a background event rate of the detection signals, the laser measuring means comprising a coincidence depth presetting stage for presetting the coincidence depth for the coincidence recognition stage, and the coincidence depth presetting stage being configured to preset the coincidence depth while taking into account the background event rate. Within this context, provision may be made for the coincidence depth to be increased when the background event rate increases.

By presetting the coincidence depth while taking into account the background event rate, the quality of the measurements of the distances may be further improved.

In simpler designs, however, the coincidence depth may also be preset on the basis of empirically established figures, for example.

In accordance with an advantageous further development of the invention, the coincidence depth presetting stage is configured to determine signal/noise ratios of probability density functions for the occurrence of a first coincidence signal of the coincidence signals at different values for the coincidence depth, one of the signal/noise ratios being determined for each of the different values; that value of the different values which is associated with a maximum signal/noise ratio of the signal/noise ratios is preset as the coincidence depth. Generally, the quality of the measurement of the distances increases as the signal/noise ratio of the probability density function for the occurrence of a first coincidence signal of the coincidence signals increases. Within this context, the signal/noise ratio depends on the coincidence depth.

By calculating the respective signal/noise ratio for a multitude of possible coincidence depths prior to the actual measuring cycle is it possible to preset, for the measuring cycle, that coincidence depth which will result in the best signal/noise ratio, so that the quality of the measurements of the distances may be further improved.

In accordance with an advantageous further development of the invention, the coincidence depth presetting stage is configured such that the coincidence depth is constant during the measuring cycle. As a result, a high signal/noise ratio may be maintained during the entire measuring cycle, so that the quality of the measurements of the distances may be further improved.

In accordance with an advantageous further development of the invention, the coincidence time presetting stage is configured such that the coincidence time strictly monotonically increases during the measuring cycle. Strictly monotonically increasing here means that the coincidence time increases during the measuring cycle and is larger, at each point in time during the measuring cycle, than it was at the preceding points in time of the measuring cycle. In this manner, the quality of the measurements of the distances may be further improved.

In accordance with an expedient further development of the invention, the coincidence time presetting stage is configured such that the coincidence time during the measuring cycle is preset such that a probability density function for the occurrence of a first coincidence signal of the coincidence signals deviates by a maximum of 10% from a constant value during the measuring cycle when one considers exclusively the background event rate of the detection signals. Ideally, the probability density function for the occurrence of a first coincidence signal of the coincidence signals comprises a constant value during the measuring cycle when one considers exclusively the background event rate of the detection signals. However, this is not always possible in practice. However, it has turned out that the quality of the measurement of the distances can be substantially improved, as compared to devices having constant coincidence times, even if upward or downward deviations by 10% are maintained.

In accordance with a further development of the invention, the coincidence time presetting stage is configured such that the measuring cycle is subdivided into several partial measuring cycles, the coincidence time being determined at the beginning of one of the partial measuring cycles in each case and being maintained constant for the respective partial measuring cycle. In this manner, the computing expenditure may be clearly reduced while the quality of the measurement of the distances may nevertheless be considerably improved as compared to devices having constant coincidence times.

In accordance with an advantageous further development of the invention, the detection unit comprises a multitude of detectors for detecting individual photons, the detectors comprising mutually corresponding sensing areas, and the coincidence depth being preset not to be larger than a number of the detectors. This ensures that, if the number of photons occurring within the sensing area of the detection unit corresponds to the coincidence depth, the coincidence signal will be generated even if the detectors exhibit, after detecting one of the photons, a dead time during which detection of a further photon is not possible.

In accordance with an advantageous further development of the invention, the optical sensor comprises a multitude of detection units which comprise different sensing areas. In this manner, three-dimensional distance images may be captured in high quality.

In accordance with one expedient further development of the invention, the travel-time measuring means is configured such that the distance is determined on the basis of a travel-time measurement of the detection signals of the detection unit when the preset coincidence depth is one, and such that the distance is determined on the basis of the travel-time measurement of the detection signals of the coincidence signals when the preset coincidence depth is larger than one. Thus, determination of the coincidence time may be dispensed with in cases where said determination is not required. Such a case may occur, in particular, when the background event rate is very low. In this manner, the computing expenditure may be clearly reduced while the quality of the measurement of the distances may nevertheless be substantially improved as compared to devices with a constant coincidence time.

In a further aspect, the invention relates to a method of operating a laser measuring means for measuring a distance from an object, the method comprising:

emitting a laser pulse at the beginning of a measuring cycle by means of a pulse laser;

generating detection signals by means of at least one detection unit of an optical sensor, the detection unit comprising at least one detector for detecting individual photons, wherein during the measuring cycle, one of the detection signals is generated by the detection unit each time one of the photons is detected by the detector;

generating coincidence signals by means of a coincidence recognition stage, wherein during the measuring cycle, one of the coincidence signals is generated each time the detection signals generated by the detection unit reach at least a preset coincidence depth within a coincidence time;

presetting the coincidence time for the coincidence recognition stage by a coincidence time presetting stage, the coincidence time being preset such that the coincidence time monotonically increases during the measuring cycle; and determining the distance by means of a travel-time measuring means on the basis of a travel-time measurement of the coincidence signals.

In a further aspect, the invention relates to a computer program for performing an inventive method.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
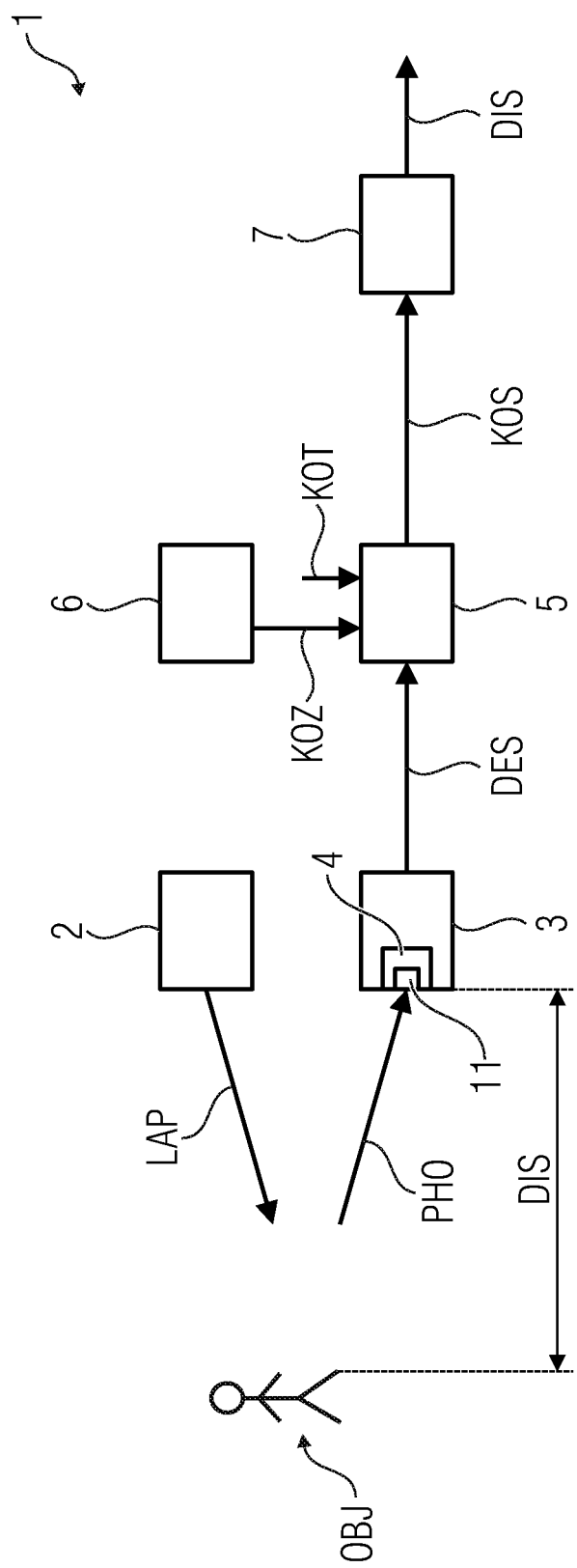
FIG. 1 shows a first embodiment of an inventive laser measuring means in a schematic representation.

Elements which are identical or similar or have identical or equivalent functions will be provided with identical or similar reference numerals below.

In the following description, embodiments exhibiting a multitude of features of the present invention will be described in more detail to provide enhanced understanding of the invention. However, it is to be stated that the present invention may also be implemented while omitting individual ones of the features described. It shall also be noted that the features shown in various embodiments may also be combined in different manners unless this is explicitly excluded or would lead to conflicts.

FIG. 1 shows a first embodiment of an inventive laser measuring means 1 for measuring a distance DIS from an object OBJ in a schematic representation.

The laser measuring means 1 for measuring a distance DIS from an object OBJ comprises the following features:

a pulse laser 2 for emitting a laser pulse LAP at the beginning of a measuring cycle MZ;

an optical sensor 3 comprising at least one detection unit 4 for generating detection signals DES, the detection unit 4 comprising at least one detector 11 for detecting individual photons PHO, the detection unit 4 generating one of the detection signals DES, during the measuring cycle MZ, each time one of the photons PHO is detected by the detector 11;

a coincidence recognition stage 5 for generating coincidence signals KOS, wherein during the measuring cycle MZ, one of the coincidence signals KOS is generated each time the detection signals DES generated by the detection unit 4 reach at least a preset coincidence depth KOT within a coincidence time KOZ;

a coincidence time presetting stage 6 for presetting the coincidence time KOZ for the coincidence recognition stage 5, the coincidence time presetting stage 6 being configured such that the coincidence time KOZ monotonically increases during the measuring cycle MZ; and travel-time measuring means 7 for determining the distance DIS on the basis of a travel-time measurement of the coincidence signals KOS.

In a further aspect, the invention relates to a method of operating a laser measuring means 1 for measuring a distance DIS from an object OBJ, the method comprising:

emitting a laser pulse LAP at the beginning of a measuring cycle MZ by means of a pulse laser 2;

generating detection signals DES by means of at least one detection unit 4 of an optical sensor 3, the detection unit 4 comprising at least one detector 11 for detecting individual photons PHO, wherein during the measuring cycle MZ, one of the detection signals DES is generated by the detection unit 4 each time one of the photons PHO is detected by the detector 4;

generating coincidence signals KOS by means of a coincidence recognition stage 5, wherein during the measuring cycle MZ, one of the coincidence signals KOS is generated each time the detection signals DES generated by the detection unit 4 reach at least a preset coincidence depth KOT within a coincidence time KOZ;

presetting the coincidence time KOZ for the coincidence recognition stage 5 by a coincidence time presetting stage 6, the coincidence time KOZ being preset such that the coincidence time KOZ monotonically increases during the measuring cycle MZ; and determining the distance DIS by means of a travel-time measuring means 7 on the basis of a travel-time measurement of the coincidence signals KOS.

In a further aspect, the invention relates to a computer program for performing an inventive method.

The invention is based on the advancement of known travel time-based distance measuring methods. While with known laser measuring means 1, the travel-time measuring means 7 is configured to determine the distance DIS on the basis of a travel-time measurement of the detection signals DES, provision is made, in the inventive laser measuring means 1, for the travel-time measuring means 7 to be configured to determine the distance DIS on the basis of a travel-time measurement of the coincidence signals KOS, the coincidence signals KOS being generated by means of a coincidence time KOZ which is variable within the measuring cycle MZ, namely by means of a monotonically increasing coincidence time KOZ.

In order to be able to better understand the invention, determination of the distance DIS on the basis of travel-time measurement of the detection signals DES shall be initially explained:

Existing laser measuring means 1 are based on various principles. In the direct method addressed here, the travel time of a laser pulse LAP is sensed from emission via reflection at the target object OBJ up to detection within the sensor 3 by means of an electronic chronometer (e.g., time-to-digital converter, TDC). Within this context, time measurement is started with emission of a short laser pulse LAP and ended with reception of the reflected pulse LAP [1]. In the first-photon method, the time measurement is ended with the first event that is detected by the sensor 3 after the start. Ideally, the time measured corresponds to the light propagation time and may be directly converted to the distance DIS between the sensor 3 and the target object OBJ via d=ct/2. With this approach, a high intensity of the background light results in that an event resulting from the background light may be detected prior to the arrival of the reflected laser pulse LAP at the sensor 3 and thus leads to a faulty detection signal DES, so that a faulty measurement occurs.

In order to be able to tolerate such faulty measurements as well as statistical variations, several of these time marks are typically initially collected in a histogram, from which the actual light propagation time is subsequently determined while using an algorithm. Due to corresponding weakening of the sensitivity of the sensor 3, the rate of the events generated by background light and, consequently, the number of faulty measurements may be reduced to a tolerable level. However, a lower sensitivity of the sensor 3 also reduces the reception rate of the events and/or detection signals DES generated by the detected laser pulse, which renders reliable and precise measurement more difficult, in particular for long distances.

In the direct, travel time-based method for distance measurement on the basis of the detection of the respectively first event and/or detection signal DES in each measuring cycle, the probability density function (PDF) of the first event P(t) is defined by $$P(t) = R(t)\left(1 - \int_0^t P(t)dt\right) \quad (1)$$

wherein R(t) denotes the time-dependent event rate. When assuming a time-invariant event rate, which applies in good approximation—when one considers only the background light—because of the brevity of the measuring duration, P(t) may be calculated, in accordance with an exponential distribution, according to $$P(t) = R\exp(-Rt). \quad (2)$$

When additionally taking into account the event rate $R_A$ of the reflected laser pulse, the PDF may be calculated according to $$P(t) = \begin{cases} R_B\exp(-R_B t) & \text{for } 0 \le t < T_{TOF} \\ R_{AB}\exp(-R_{AB}(t-T_{TOF}))\exp(-R_B T_{TOF}) & \text{for } T_{TOF} \le t < T_{TOF} + T_P \\ R_B\exp(-R_B t)\exp(-R_A T_P) & \text{for } T_{TOF} + T_P \le t \end{cases} \quad (3)$$

with the event rate of the background $R_B$, the travel time $T_{TOF}$, the pulse width $T_P$ as well as $R_{AB} = R_A + R_B$. This results in that the probability of receiving an event originating from the background increases as the measuring distance and the background intensity increase. Accordingly, the probability of receiving an event of the reflected laser pulse decreases as the distance increases.

Figure 2:
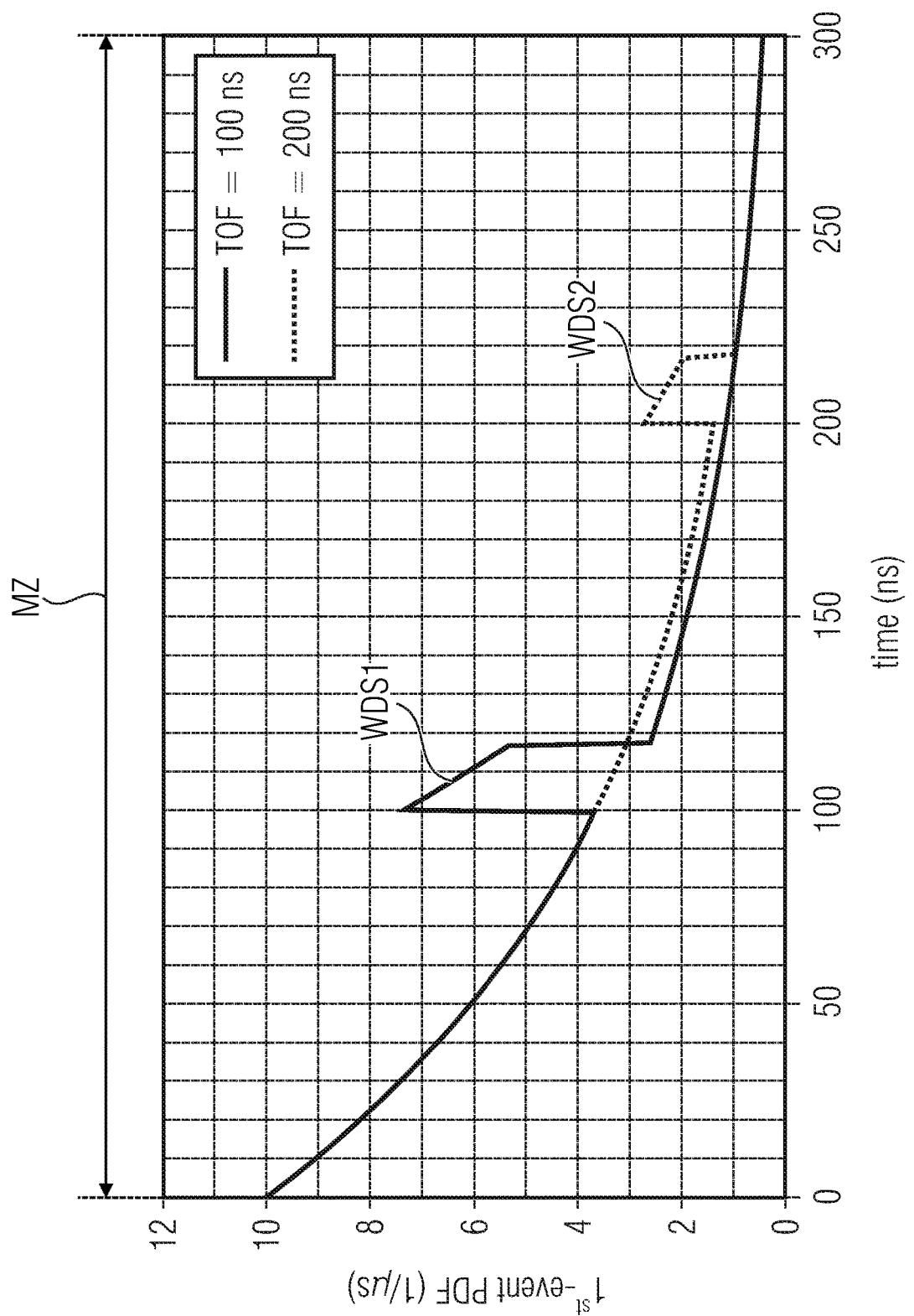
FIG. 2 shows exemplary probability density functions for the occurrence of a first detection signal for various times of flight as a function of the travel time for a measuring cycle.

FIG. 2 shows exemplary probability density functions WDS1 and WDS2 for the occurrence of a first detection signal DES for different times of flight as a function of the travel time for a measuring cycle MZ. The probability density functions WDS1 and WDS2 are calculated according to (3) for event rates of the background $R_B$ and for event rates $R_A$ of 10 MHz, respectively, and a pulse width $T_P$ of 16 ns. The travel time $T_{TOF}$ amounts to 100 ns in the probability density function WDS1 and to 200 ns in the probability density function WDS2. It is revealed here that the resulting pulse is lower at a larger distance, which corresponds to a reduced probability of its detection.

Figure 3:
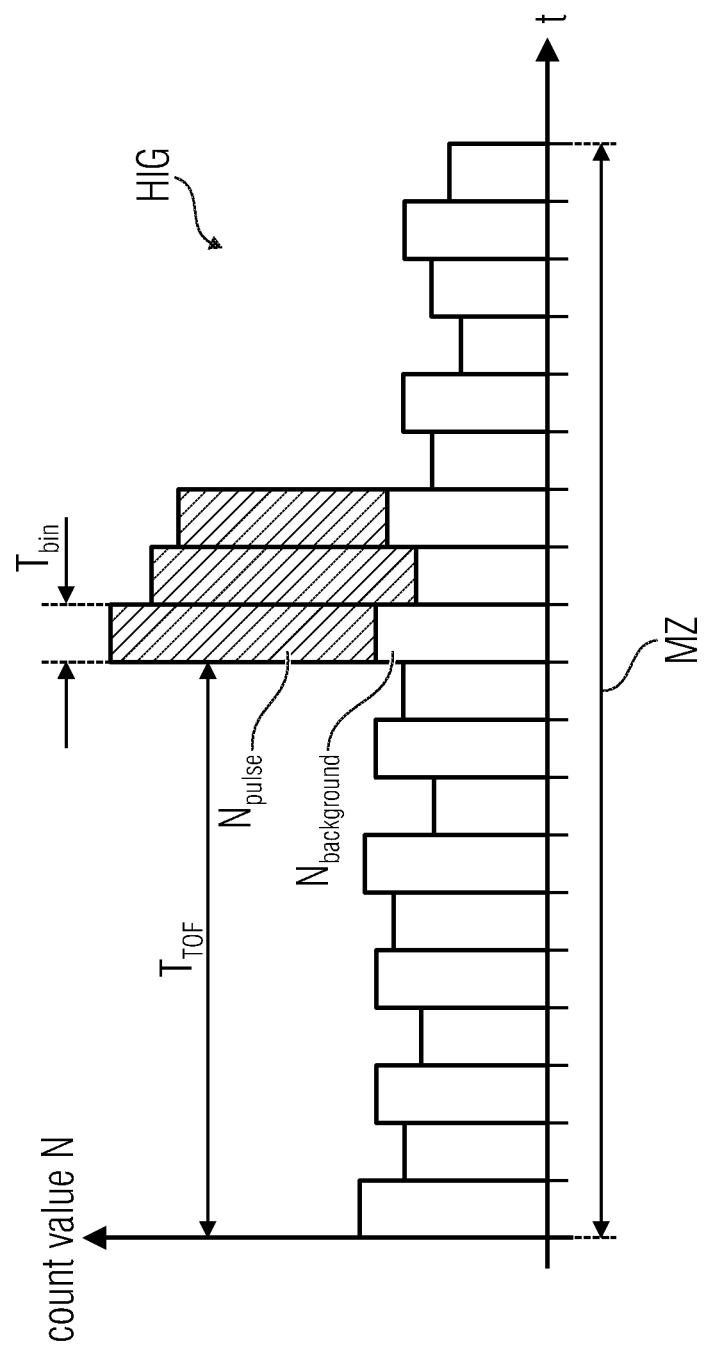
FIG. 3 shows an exemplary histogram for the occurrence of a first detection signal following accumulation of several measuring cycles.

FIG. 3 shows an exemplary histogram HIG for the occurrence of a first detection signal DES following accumulation of several measuring cycles MZ. In the direct method of distance measurement, the arrival time of the first received event is stored in a histogram HIG in a manner in which it is measured across several measuring cycles from the time of pulse emission; from said histogram HIG, the actual travel time is subsequently determined by means of a suitable evaluation specification. A possible variant of the evaluation is a mean filtering of the histogram HIG which serves to reduce the variance of the individual bins, with subsequent determination of the maximum value, the temporal position of the maximum representing the travel-time measured. In order to determine the expected values of all of the bins of the histogram HIG, the PDF P(t) is considered. Integrating said function across the time domain of the bin, multiplied by the number of time values added up, provides the respective expected value of the bin. On the basis of the histogram HIG and while assuming Poisson-distributed count values within the bins, a measure of the quality of the measurement may be defined.

In FIG. 3, the bright areas of the bins represent the events caused by background light, whereas events of the reflected and detected laser pulse are depicted as dark areas. So that the position of the pulse LAP may be reliably determined in the histogram HIG, the first bin following arrival of the reflected pulse LAP advantageously has a value higher than those of bins which have sensed background only. The quotient of the pulse-generated count value $N_{pulse}$ and the standard deviation of the entire bin $N_{pulse} + N_{background}$, which standard deviation is defined by the root of the expected value in accordance with the Poisson distribution, provides a measure of this. Accordingly, the SNR is defined as $$SNR = \frac{N_{pulse}}{\sqrt{N_{pulse} + N_{background}}} \quad (4)$$

with the number of counted events which are due to the pulse $N_{pulse}$ and the background $N_{background}$. Since said count values are a function of time and since the goal of data evaluation is to determine the pulse arrival time, the count values considered are those present at the time of pulse arrival, which corresponds to the time of flight $T_{TOF}$. If one uses the exponential distribution according to (3) as the basis, what follows is $$N_{background} = N_{cycle} \int_{T_{TOF}}^{T_{TOF}+T_{bin}} P(t)\big|_{R_A=0} dt \quad (5)$$

$$\approx N_{cycle} T_{bin} P(T_{TOF})\big|_{R_A=0}$$

$$= N_{cycle} T_{bin} R_B \exp(-R_B T_{TOF})$$

with the number of accumulated time values $N_{cycle}$ and the widths of the bins $T_{bin}$ as well as $$N_{pulse} = N_{cycle} \int_{T_{TOF}}^{T_{TOF}+T_{bin}} P(t)\Big|_{R_A \neq 0} dt - N_{background} \approx \qquad (6)$$

$$N_{cycle} T_{bin} P(T_{TOF})|_{R_A \neq 0} - N_{background} = N_{cycle} T_{bin} R_A \exp(-R_B T_{TOF}).$$

The approximations made in (5) and (6) assume a constant PDF across the bin considered and therefore apply to short bins and/or low rates. Thus, the following results for the SNR according to (4):

$$SNR = \sqrt{N_{cycle} T_{bin}} \frac{P(T_{TOF})|_{R_A \neq 0} - P(T_{TOF})|_{R_A = 0}}{\sqrt{P(T_{TOF})|_{R_A \neq 0}}} = \qquad (7)$$

$$\sqrt{N_{cycle} T_{bin} \exp(-R_B T_{TOF})} \frac{R_A}{\sqrt{R_A + R_B}}$$

with the event rate $R_A$ of the reflected laser pulse and the event rate $R_B$ of the background light.

Figure 4:
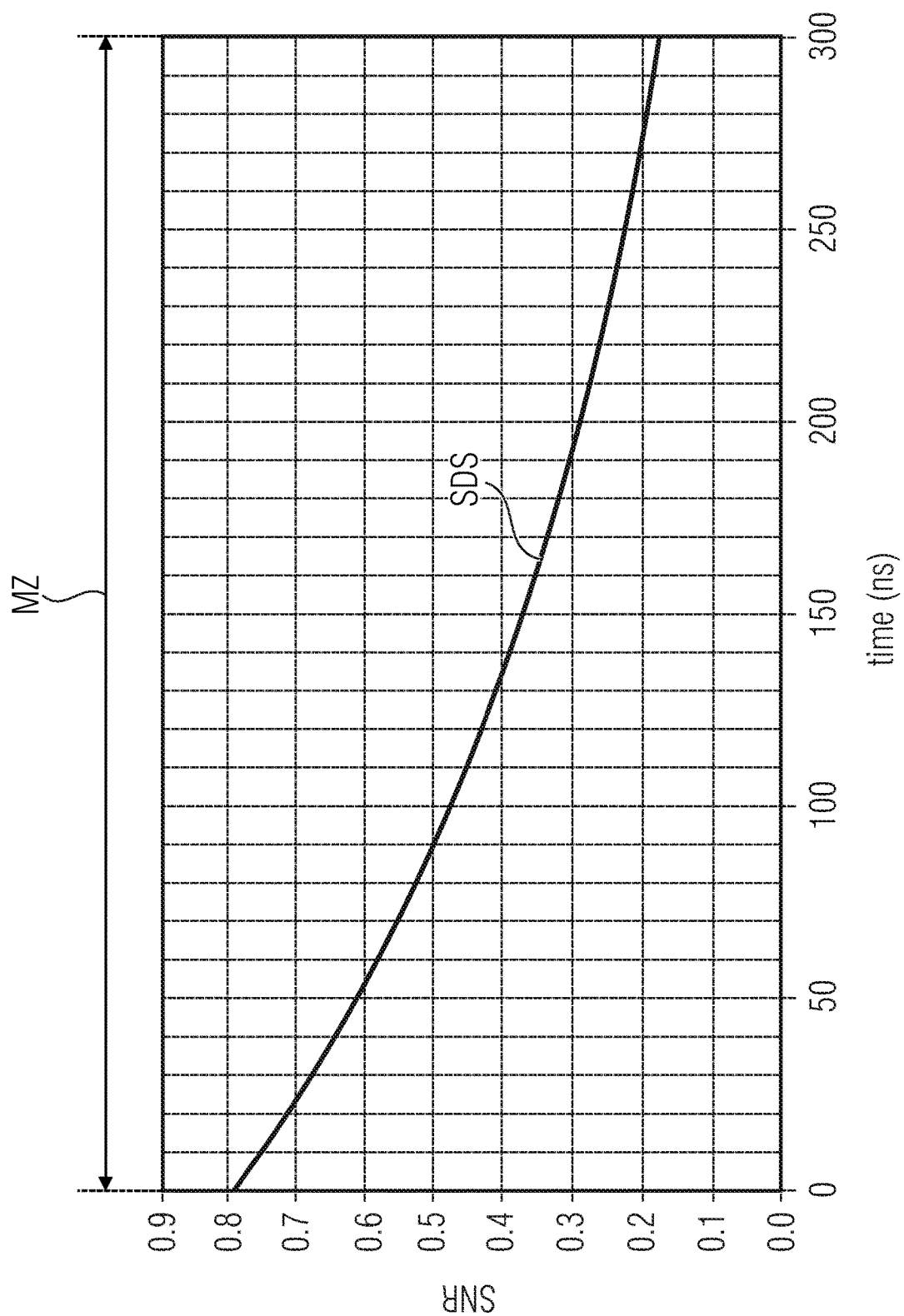
FIG. 4 shows an exemplary representation of a signal/noise ratio of a travel-time measurement on the basis of the detection signals as a function of the travel time for a measuring cycle.

FIG. 4 shows an exemplary representation of a signal/noise ratio SDS of a travel-time measurement on the basis of the detection signals DES as a function of the travel time for a measuring cycle MZ, SNR indicating the value of the signal/noise ratio SDS in the course of time. Here, a decrease in the signal/noise ratio SDS and, therefore, in the quality of the measurement, takes place as the travel time $T_{TOF}$ increases. FIG. 4 shows the signal/noise ratio SDS calculated according to (7) for an event rate $R_B$ of 10 MHz for the background, for an event rate $R_A$ of the laser pulse of 10 MHz, at 400 cycles and a bin width of 312.5 ps.

In the following, the signal/noise ratio SDS is also to be used for a comparison with the inventive method. In the real application, the intensity of the reflected laser pulse LAP additionally scales with the inverse square of the distance and/or travel time. This additionally aggravates the problem of the decreasing signal/noise ratio SDS, which is why the quality of the measurement for larger ranges decreases further and accordingly small ranges are achieved.

Figure 5:
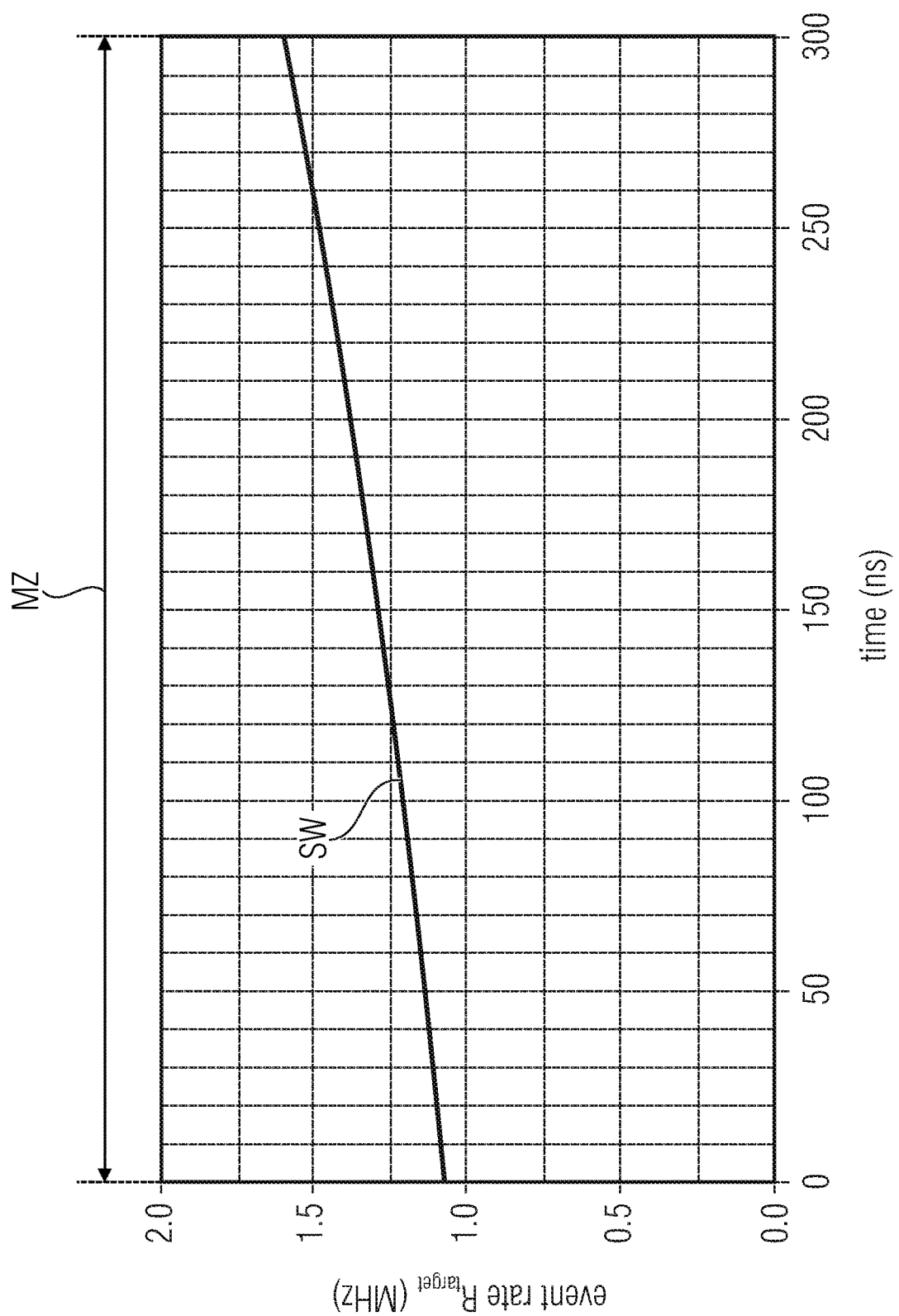
FIG. 5 shows an exemplary representation of a target value of a background event rate of the coincidence signals for a constant probability density function for the occurrence of a first coincidence signal when one considers exclusively the background event rate of the detection signals as a function of the travel time for a measuring cycle.

FIG. 5 shows an exemplary representation of a curve SW of a target value $R_{target}(t)$ of a background event rate of the coincidence signals KOS for a constant probability density function WKS (shown in FIG. 7) for the occurrence of a first coincidence signal KOS when exclusively considering the background event rate of the detection signals DES as a function of the travel time for a measuring cycle MZ.

The inventive method reduces the dependence of the quality of the measurement on the distance. For providing a basic description of the method, the dependence of the pulse intensity on the distance DIS shall initially be neglected. In order to obtain constant quality of the measurement across the entire measuring distance, the probability density function WKS of the first event, which leads to generation of a coincidence signal KOS, is expected, according to (3), to be independent of the travel time when the reflected laser pulse LAP is neglected. If (1) is considered, given $P(t) = P_{const}$, this directly results in that said being independent of the travel time can only be achieved by varying the event rate according to $$R_{target}(t) = \frac{P_{const}}{1 - P_{const} t} \qquad (8)$$

FIG. 5 shows the event rate according to (8) for a PDF $P_{const} = 1.08 \ast 10^6$ s$^{-1}$.

Figure 6:
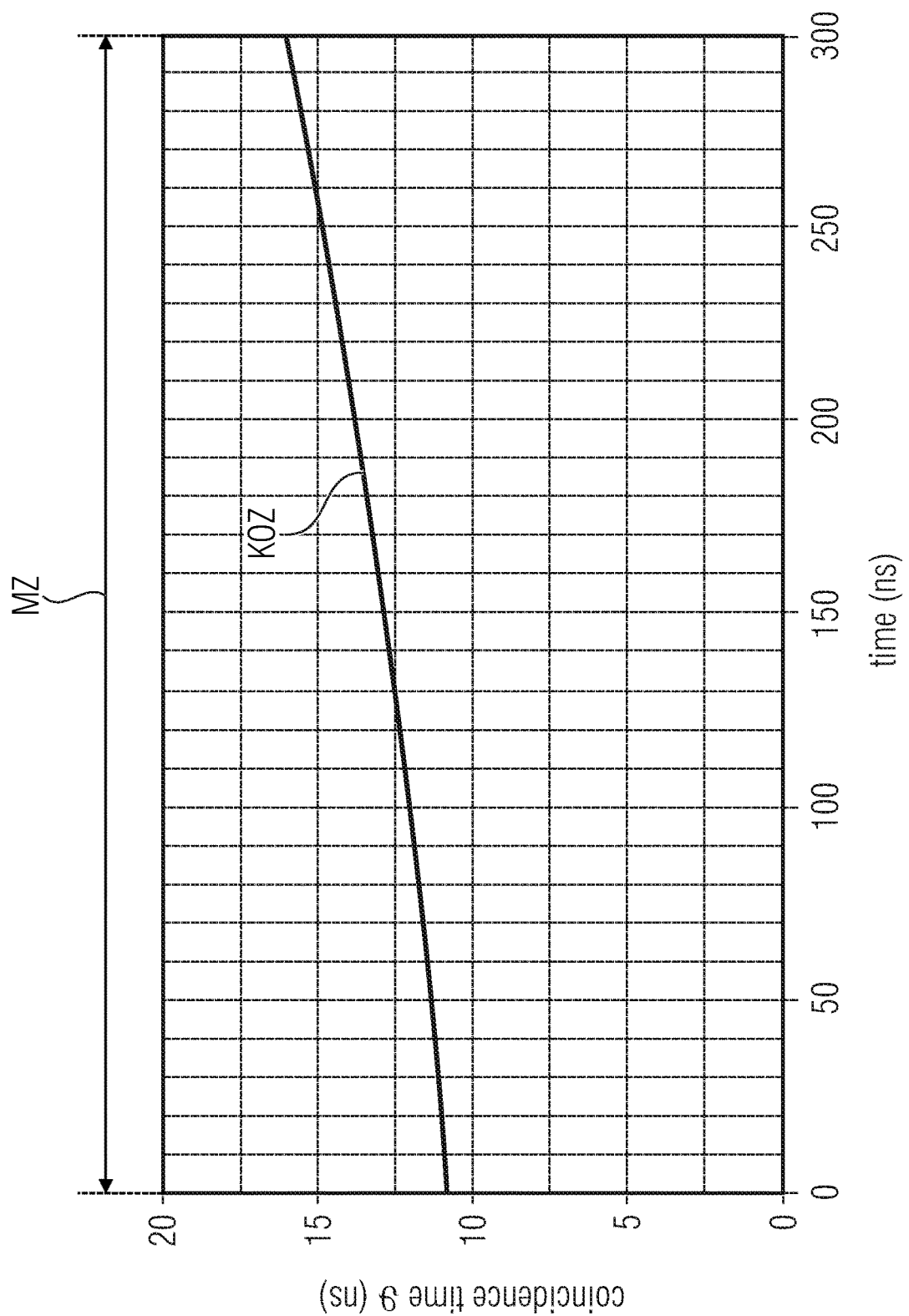
FIG. 6 shows an exemplary representation of a coincidence time as a function of the travel time for a measuring cycle, which results when using the target value of FIG. 5.

FIG. 6 shows an exemplary representation of a coincidence time KOZ as a function of the travel time for a measuring cycle MZ, which coincidence time KOZ results when using the target value $R_{target}(t)$ of FIG. 5.

In accordance with a further embodiment of the invention, the coincidence time presetting stage 6 is configured such that the coincidence time KOZ strictly monotonically increases during the measuring cycle MZ.

To be able to vary the event rate in time, one will not use individually detected photons PHO and/or detection signals DES as the basis in terms of events, but one will consider photon coincidences and/or correlation signals KOS [2]. Within this context, an event will take place precisely when at least a defined number, the so-called coincidence depth KOT, of individual photons is received within a defined time period, the so-called coincidence time KOZ. The event rate resulting from this method is a function both of the coincidence depth KOT and of the coincidence time KOZ. However, since only the latter allows continuous variation of a sufficiently fine resolution, which may be used, according to (8), for achieving the goal of a constant probability density function WKS, adaptation of the event rate R(t) is effected by varying the coincidence time KOZ. To determine the useful variation of the coincidence time KOZ, a model may be used which describes the event rate in accordance with the coincidence method as a function of the parameter n indicating the coincidence depth KOT, of the parameter $\vartheta$ indicating the coincidence time, and of the parameter R indicating the individual photon detection rate. For this purpose, a simple model may be initially considered. Here, $$R_C(t) = \frac{R^n \vartheta(t)^{n-1}}{(n-1)!} \qquad (9)$$

applies, with the resulting event rate $R_C$. The model is based on an exponentially distributed intermediate arrival time of the individual photons according to (2) and may be derived from the model in [3] by means of further approximation in accordance with $$R_C = \frac{R^n \vartheta^{n-1} n}{(1 + R\vartheta)(n-1)! n - (R\vartheta)^n} \approx \frac{R^n \vartheta^{n-1}}{(n-1)!} \qquad (10)$$

for $R\vartheta \ll 1$. The approach shown here is generally valid and may also be transferred to more complex models of photon coincidence, whereby the full potential of the method may be exploited. Since the event rate in accordance with the correlation method $R_C$ advantageously corresponds to the target value of the event rate according to (8), $R_{target}$, in order to obtain a constant PDF, (8) and (9) will be equated from now on. This provides the specification for varying the coincidence time KOZ in accordance with $$\vartheta(t) = \sqrt[n-1]{\frac{(n-1)!P_{const}}{(1-P_{const}t)R^n}} \quad (11)$$

FIG. 6 shows the coincidence time according to (11) for $P_{const}=1.08*10^6$ s$^{-1}$, n=2 and R=10 MHz. The shape of the curve corresponds to FIG. 5 since for the selected coincidence depth KOT of n=2, the event rate $R_C(t)$ following photon correlation according to (9) is defined by $R_C(t)|_{n=2}=R^2\vartheta(t)$ and is therefore directly proportional to the coincidence time KOZ. For larger coincidence depths KOT, the proportionality exhibits a higher order, as a result of which the curves differ in quality.

Figure 7:
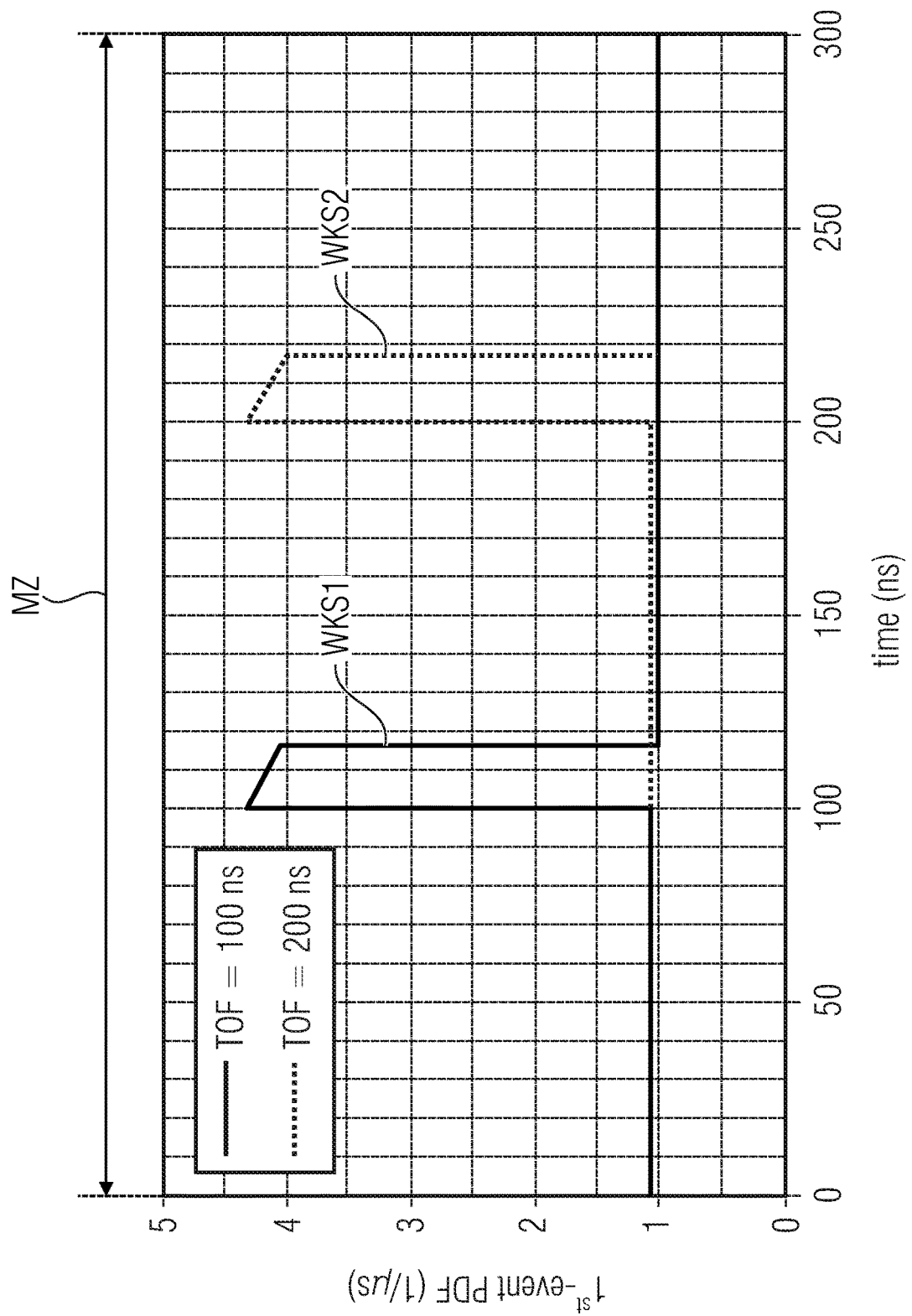
FIG. 7 shows exemplary probability density functions for the occurrence of a first coincidence signal for different times of flight as a function of the travel time for a measuring cycle, which results when using the coincidence time of FIG. 6.

FIG. 7 shows exemplary probability density functions WKS1 and WKS2 for the occurrence of a first coincidence signal KOS for various times of flight as a function of the travel time for a measuring cycle MZ, which results when using the coincidence time KOZ of FIG. 6.

In accordance with a further development of the invention, the coincidence time presetting stage 6 is configured such that the coincidence time KOZ is preset, during the measuring cycle MZ, such that a probability density function WKS for the occurrence of a first coincidence signal KOS of the coincidence signals KOS deviates by a maximum of 10% from a constant value during the measuring cycle MZ when one considers exclusively a background event rate HGE of the detection signals DES during the measuring cycle MZ. At least outside the pulse reception times as of 100 ns and of 200 ns, respectively, the probability density functions WKS1 and WKS2 exhibit values deviating by a maximum of 10% from a constant value. Thus, the quality of the travel-time measurement is almost independent of the travel time, which also makes itself felt in the approximately identical levels of the pulses of the probability density functions WKS1 and WKS2.

In (11), the values $P_{const}$ and n are to be specified in the further course. To determine $P_{const}$ the signal/noise ratio SRV (shown in FIG. 8) of a travel-time measurement on the basis of the coincidence signals according to (4) is used. The count value of the background $N_{background}$ may be determined, with the proviso of a constant probability density function $P_{const}$, by simple multiplication by the width of the bin $T_{bin}$ and by the number of measuring cycles $N_{cycle}$. What applies is $$N_{background}=N_{cycle}T_{bin}P_{const}. \quad (12)$$

(1) shall be used as the basis for obtaining the number of events caused by the laser pulse. Up to the time $T_{TOF}$, P(t) is a constant function and may be denoted as $P_{const}$, whereby the integral can be calculated by multiplying $P_{const}$ by $T_{TOF}$. The rate R(t) at the time $T_{TOF}$ results from the model of photon correlation according to (9) with $R=R_{AB}$ and from the coincidence time according to (11) for $t=T_{TOF}$ as well as $R=R_B$. Thus, $$N_{pulse} = N_{cycle}T_{bin}P_{consst}\left(\frac{R_A}{R_B}+1\right)^n - N_{background}. \quad (13)$$

results. With (12) and (13), $$SNR = \sqrt{N_{cycle}T_{bin}P_{const}\left(\frac{R_A+R_B}{R_B}\right)^n \left(1-\left(\frac{R_B}{R_A+R_B}\right)^n\right)}. \quad (14)$$

results from (4).

It becomes apparent that the signal/noise ratio SRV now, given the constant probability density function $P_{const}$ which has been achieved, is independent of the travel time $T_{TOF}$ and now is only proportional to the root of $P_{const}$—a constant. FIG. 7 shows the probability density functions WKS1 and WKS2 of the first event when varying the rate according to (8) by adapting the event rate across a variation of the coincident time KOZ according to (11) for a coincidence depth KOT of n=2 at a constant value of the probability density function WKS1 and WKS2 of $P_{const}=1.08*10^6$ s$^{-1}$. The individual photon rates $R_B$ and $R_A$ each amount to 10 MHz for the background and the laser pulse. Here, the level of the resulting pulse and of the background are independent of the travel time, which corresponds to a constant signal/noise ratio SRV and, eventually, to the constant quality of the distance measurement that is strived for.

Generally, a constant signal/noise ratio SRV in accordance with the definition according to (4) may be achieved also while taking into account the dependence of the event rate of the laser pulse LAP on the distance; however, clearly higher dynamics of the event rate following coincidence detection may be used within this context. This results in high dynamics of the coincidence time KOZ, which involves a more complex implementation of the method.

Figure 8:
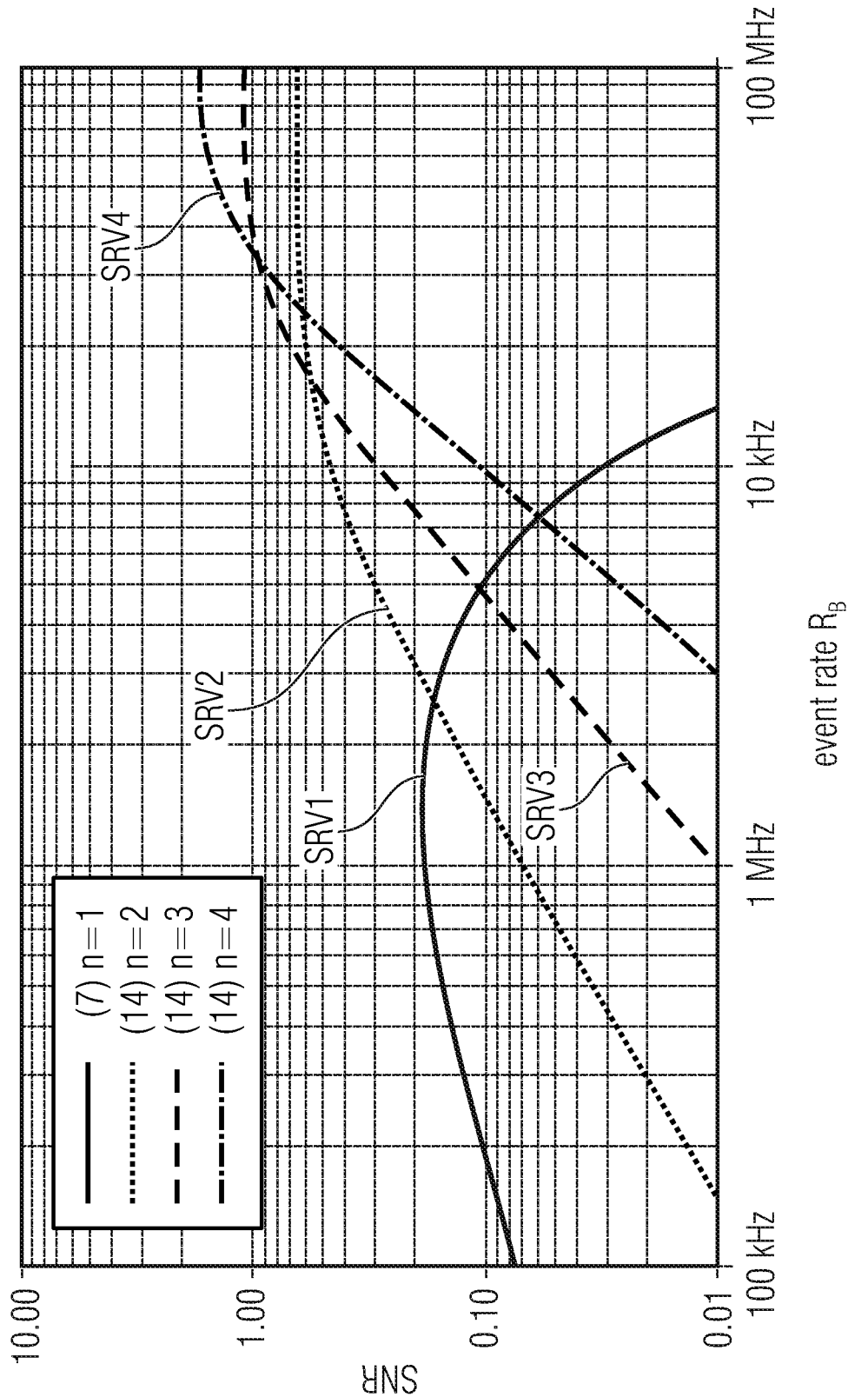
FIG. 8 shows an exemplary representation of signal/noise ratios of travel-time measurements on the basis of the coincidence signals for different coincidence depths as a function of the background event rate of the detection signals.

FIG. 8 shows an exemplary representation of signal/noise ratios SRV of travel-time measurements on the basis of the coincidence signals KOS for various coincidence depths KOT as a function of the background event rate of the detection signals DES, wherein SNR indicates the value of the signal/noise ratio SRV in the course of time.

Since this method aims at a maximum signal/noise ratio SRV, it follows from (14) that $P_{const}$ should be as high as possible. The product $P_{const}T$, wherein T is the measuring duration defined by the range of the system across $T=2d_{max}/c$, provides the number of events detected per measuring cycle MZ. Since in the case considered, only the first one and, therefore, at a maximum one event per cycle is sensed, the product may adopt the value of 1 at the most. If this condition is violated, negative values of the target event rate would result, according to (8), for higher time values, which would be impossible to implement. The influence the selection of $P_{const}$ exerts on the dynamic range of the event rate and/or of the coincidence time KOZ is shown by the following calculation. The quotient of the target event rate $R_{target}(t)$ according to (8) at the time t=0 as well as at the time t=T provides the dynamic range sought for since this function is a monotonically increasing function of t for $0 \leq t \leq T$ at the condition $P_{const}T \geq 1$. Therefore, the following applies with regard to the dynamics of the rate:

$$DR_R = \frac{R_{target}(T)}{R_{target}(0)} = \frac{1}{1-P_{const}T} \quad (15)$$

Here, it is apparent that $P_{const}T=1$ would result in an infinite dynamic range. By analogy, the dynamic range of the coincidence time $\vartheta(t)$ may be determined from the quotient of the coincidence time according to (11) for t=0 and t=T. What applies with regard to the dynamics of the coincidence time is $$DR_\vartheta = \frac{\vartheta(T)}{\vartheta(0)} = {}^{n-1}\!\!\sqrt{\frac{1}{(1-P_{const}T)}} \quad (16)$$

which allows the same conclusion to be drawn. In the real application, the range of a possible coincidence time KOZ in accordance with $\vartheta_{min} \le \vartheta(t) \le \vartheta_{max}$ is limited by technical or physical parameters. The limits for the parameter $P_{const}$ may be calculated, by means of a corresponding conversion, from the two limits $\vartheta_{min}$ and $\vartheta_{max}$ while using (11). The basis for this is that the minimum value $\vartheta_{min}$ of the coincidence time KOZ advantageously applies at the time t=0, and the maximum value $\vartheta_{max}$ of the coincidence time advantageously applies at the time t=T. Thus, the following results from (11):

$$P_{min} = \frac{\vartheta_{min}^{n-1} R^n}{(n-1)!} \quad (17)$$

as well as $$P_{max} = \frac{\vartheta_{max}^{n-1} R^n}{(n-1)! + T\vartheta_{max}^{n-1} R^n}. \quad (18)$$

Since the coincidence time KOZ according to (11) is a monotonically increasing function of time, a constant probability density function WKS may be achieved only if $P_{min} \le P_{max}$ applies. Thus, it is ensured that the event rate according to (9) can be set to be sufficiently low or high to achieve a constant probability density function WKS across the time domain $0 \le t \le T$. Thus, the following results from (17) and (18):

$$P_{min} \le P_{max} \to 1 \le \frac{(\vartheta_{max}^{n-1} - \vartheta_{min}^{n-1})(n-1)!}{\vartheta_{min}^{n-1} \vartheta_{max}^{n-1} T R^n} \sim R^{-n}. \quad (19)$$

This condition may also be derived from $\vartheta(0, P_{const}=P_{max}) \ge \vartheta_{min}$ and/or $\vartheta(T, P_{const}=P_{min}) \le \vartheta_{max}$; i.e., at a maximum value $P_{max}$ of the probability density function WKS, the coincidence time KOZ that may be used as a minimum advantageously will not be below $\vartheta_{min}$, and/or with a minimum value $P_{min}$ of the probability density function WKS, the maximum coincidence time KOZ advantageously will not be above $\vartheta_{max}$. The inequation shows that there is a limitation only in the direction of the increasing individual photon rate R. For decreasing rates, it is usually possible to achieve a constant $P_{const}$, but $P_{const}$ itself will decrease at the same time, which is why the signal/noise ratio SRV according to (14) and, therefore, the quality of the measurement will decrease.

In order to determine up to which event rate it is actually useful to vary the coincidence time KOZ and/or to apply photon correlation, the signal/noise ratios SDS and SRV according to equations (7) and (14) are compared. Since the real travel time is not known, $T_{TOF}=T$ is specified (7), and n=2 and $P_{const}=P_{max}$ are specified in (14). The analogous approach is used for determining the optimum value n for the coincidence depth KOT. Here, the signal/noise ratio SRV according to (14) is determined for all of the available n, and the depth KOT having the highest signal/noise ratio SRV is selected. FIG. 8 shows the signal/noise ratios SRV1-4 for the coincidence depths KOT of n=1 (no coincidence) up to n=4 for $N_{cycle}$=400, $T_{bin}$=312.5 ps, $P_{const}=P_{max}$ $T_{TOF}$=T=660 ns and $R_A=R_B$. Here, it is apparent that when using the method presented, the signal/noise ratio SRV indeed becomes constant at a high level but will not drop again for higher event rates as opposed to the measurement without coincidence. It is to be noted that the signal/noise ratio SRV calculated according to (14) will apply only as long as (19) is met.

Figure 9:
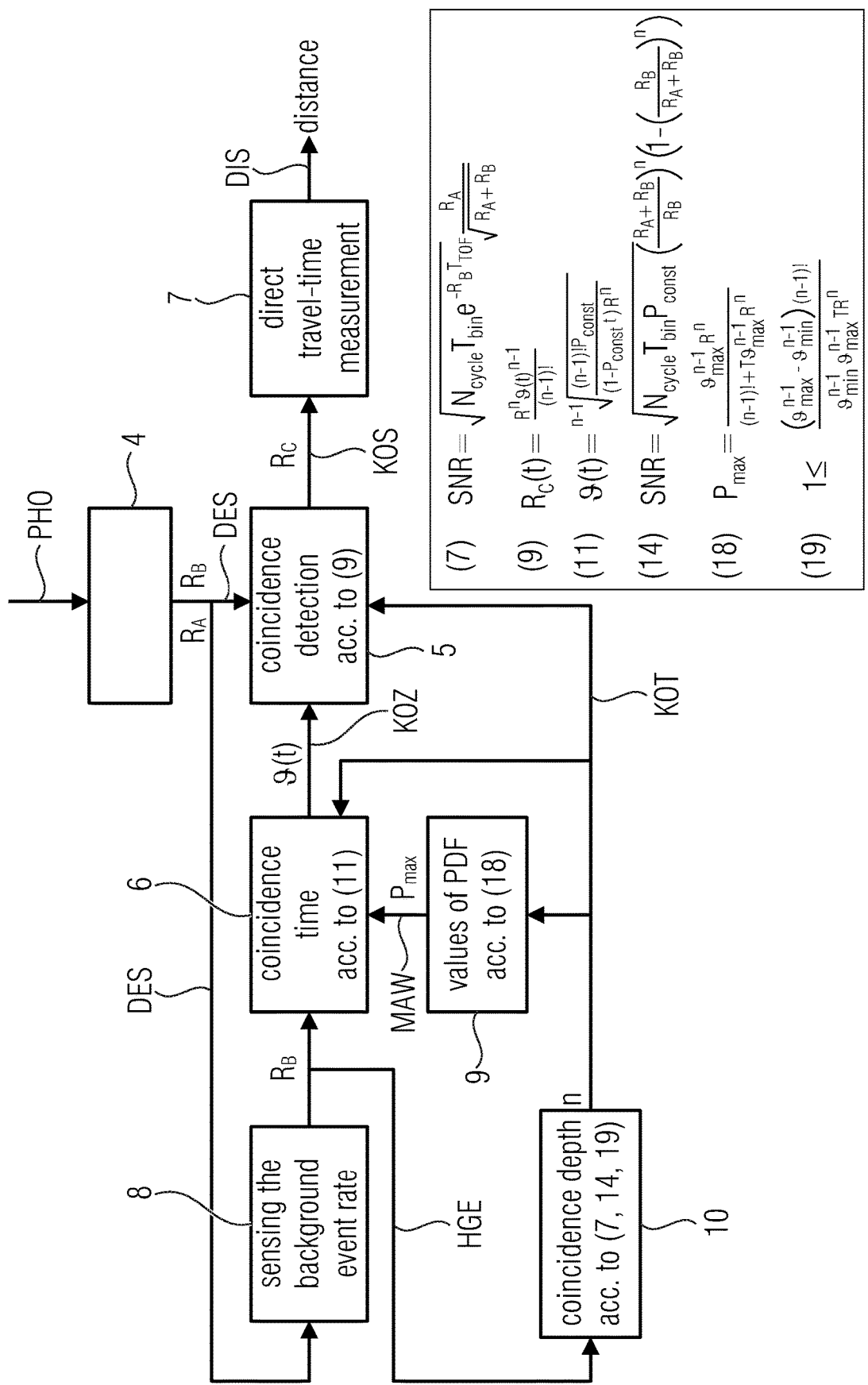
FIG. 9 shows a second embodiment of an inventive laser measuring means in a schematic partial representation.

FIG. 9 shows a second embodiment of an inventive laser measuring means 1 in a schematic partial representation. The second embodiment is based on the first embodiment, so that merely the variations and supplements of the second embodiment will be explained below.

In accordance with an expedient further development of the invention, the laser measuring means 1 comprises a background event rate determining stage 8 for determining a background event rate HGE of the detection signals DES, the coincidence time presetting stage 6 being configured to preset the coincidence time KOZ while taking the background event rate HGE into account. Within this context, the value $R_B$ used above corresponds to the background event rate HGE.

In accordance with an expedient further development of the invention, the coincidence time presetting stage 6 is configured to preset the coincidence time KOZ while taking the preset coincidence depth KOT into account.

In accordance with an expedient further development of the invention, the laser measuring means 1 comprises a maximum value determining stage 9 for determining a maximum value MAW of a constant probability density function WKS for the occurrence of a first coincidence signal KOS of the coincidence signals KOS when one exclusively considers a background event rate HGE of the detection signals DES at the preset coincidence depth KOT, the coincidence time presetting stage 6 being configured to preset the coincidence time KOZ while taking into account the maximum value MAW. Within this context, the above-calculated value $P_{max}$ may correspond to the maximum value MAW.

In accordance with an advantageous further development of the invention, the laser measuring means 1 comprises a background event rate determining stage 8 for determining a background event rate HGE of the detection signals DES, the laser measuring means 1 comprising a coincidence depth presetting stage 10 for presetting the coincidence depth KOT for the coincidence recognition stage 5, and the coincidence depth presetting stage 10 being configured to preset the coincidence depth KOT while taking into account the background event rate HGE.

In accordance with an advantageous further development of the invention, the coincidence depth presetting stage 10 is configured to determine signal/noise ratios SRV of probability density functions WKS for the occurrence of a first coincidence signal KOS of the coincidence signals KOS at different values for the coincidence depth KOT, one of the signal/noise ratios SRV being determined for each of the different values; that value of the different values which is associated with a maximum signal/noise ratio SRV of the signal/noise ratios SRV is preset as the coincidence depth KOT.

In accordance with an expedient further development of the invention, the coincidence depth presetting stage 10 is configured such that the coincidence depth KOT is constant during the measuring cycle MZ.

An exemplary progress of a distance measurement by means of the direct travel-time method while using the adaptation of the coincidence time KOZ is depicted in FIG. 9. The values $R_A$ and $R_B$ of the event rates result from the background light and from the laser source used. Since the value $R_B$ of the background event rate HGE may be used for specifying the coincidence time KOZ, said value $R_B$ is determined first. In the further process, the optimum value n of the coincidence depth KOT is specified, on the basis of equations (7) and (14) and of inequation (19), from the value $R_B$ of the background event rate HGE of the background. Thus, and with the maximum value $\vartheta_{max}$ of the coincidence time KOZ and the measuring duration T, the value $P_{const}$ of the of the constant probability density function WKS is now calculated by using (18). From the value $P_{const}$, from the value $R_B$ of the background event rate HGE and from the previously specified value n of the coincidence depth KOT, the value $\vartheta(t)$ of the coincidence time KOZ is determined as a function of the travel time, which will be supplied to the coincidence recognition stage 5 for detecting events. There, the coincidence signals KOS are formed from the incoming detection signals DES with the event rates $R_A$ and $R_B$, wherein the coincidence signals KOS with the event rate having the value $R_C$ comprise a probability density function WKS with the constant value $P_{const}$ for the background light portion, so that following summation of several travel-time measurements, a histogram HIG with a constant background count value will result.

Figure 10:
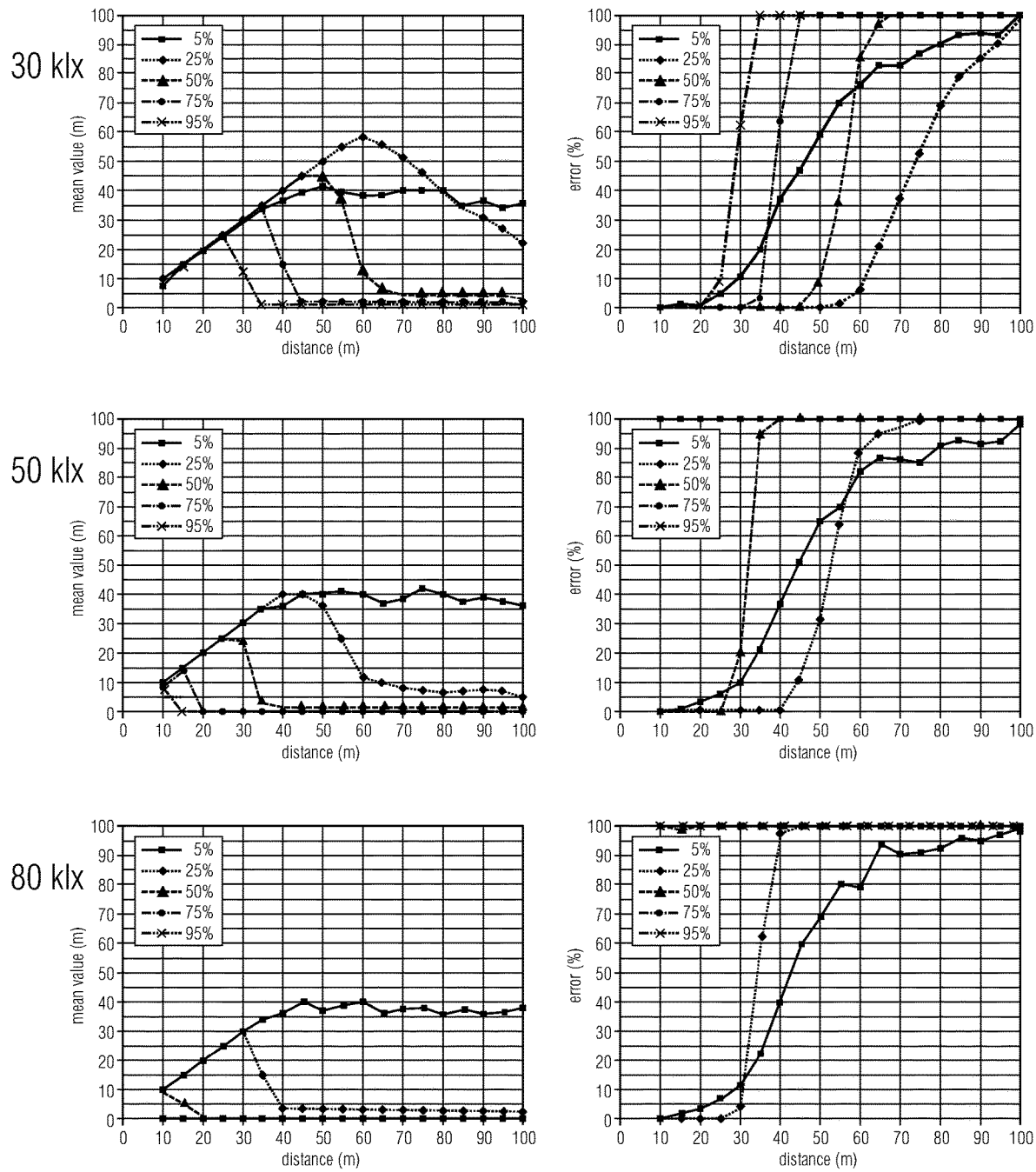
FIG. 10 shows exemplary mean values and error probabilities for distance measurements with constant coincidence time for different background illumination levels for different reflectances of the respective object.
Figure 11:
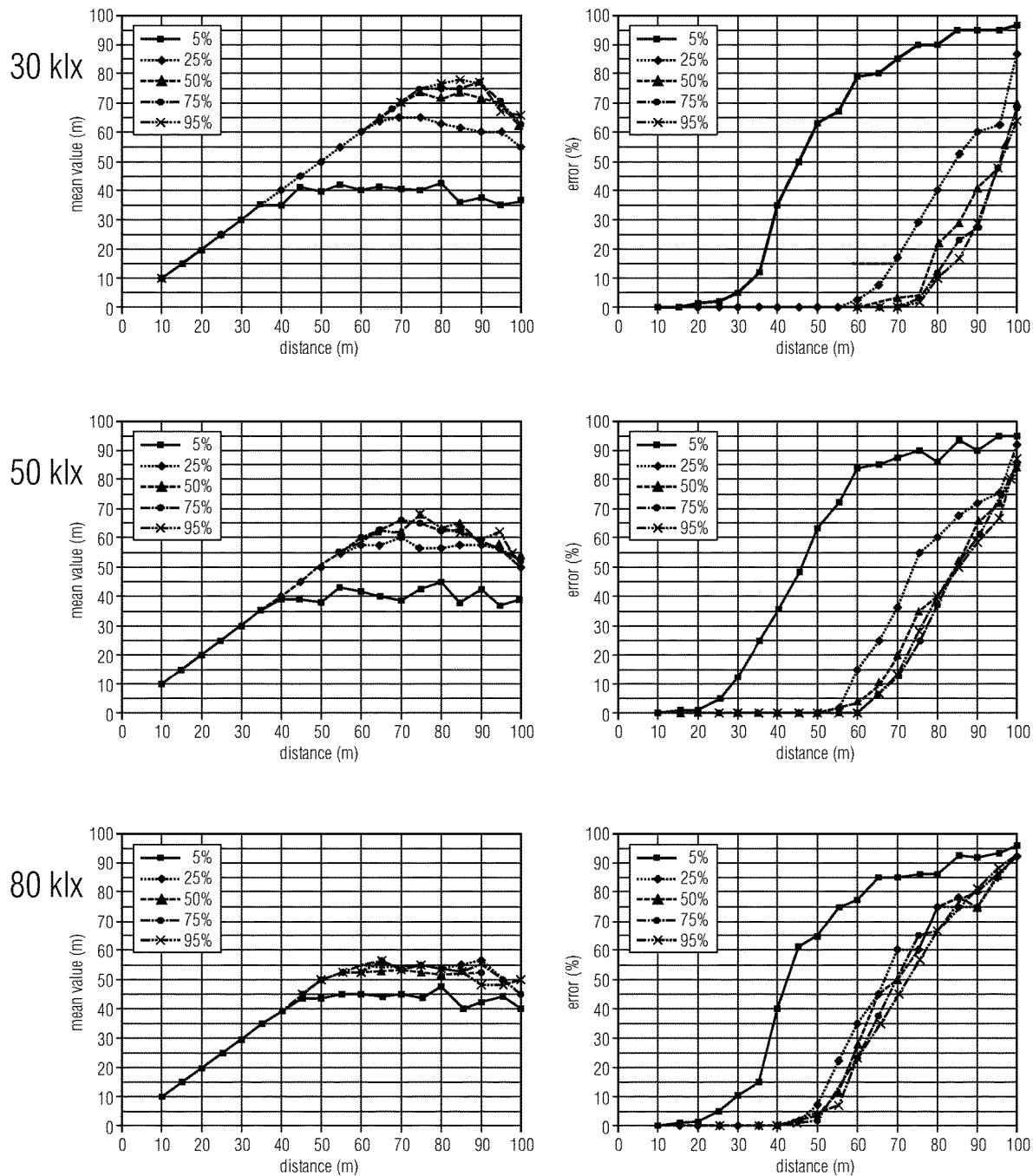
FIG. 11 shows exemplary mean values and error probabilities for distance measurements with monotonically increasing coincidence time for different reflectances of the respective object.
Figure 12:
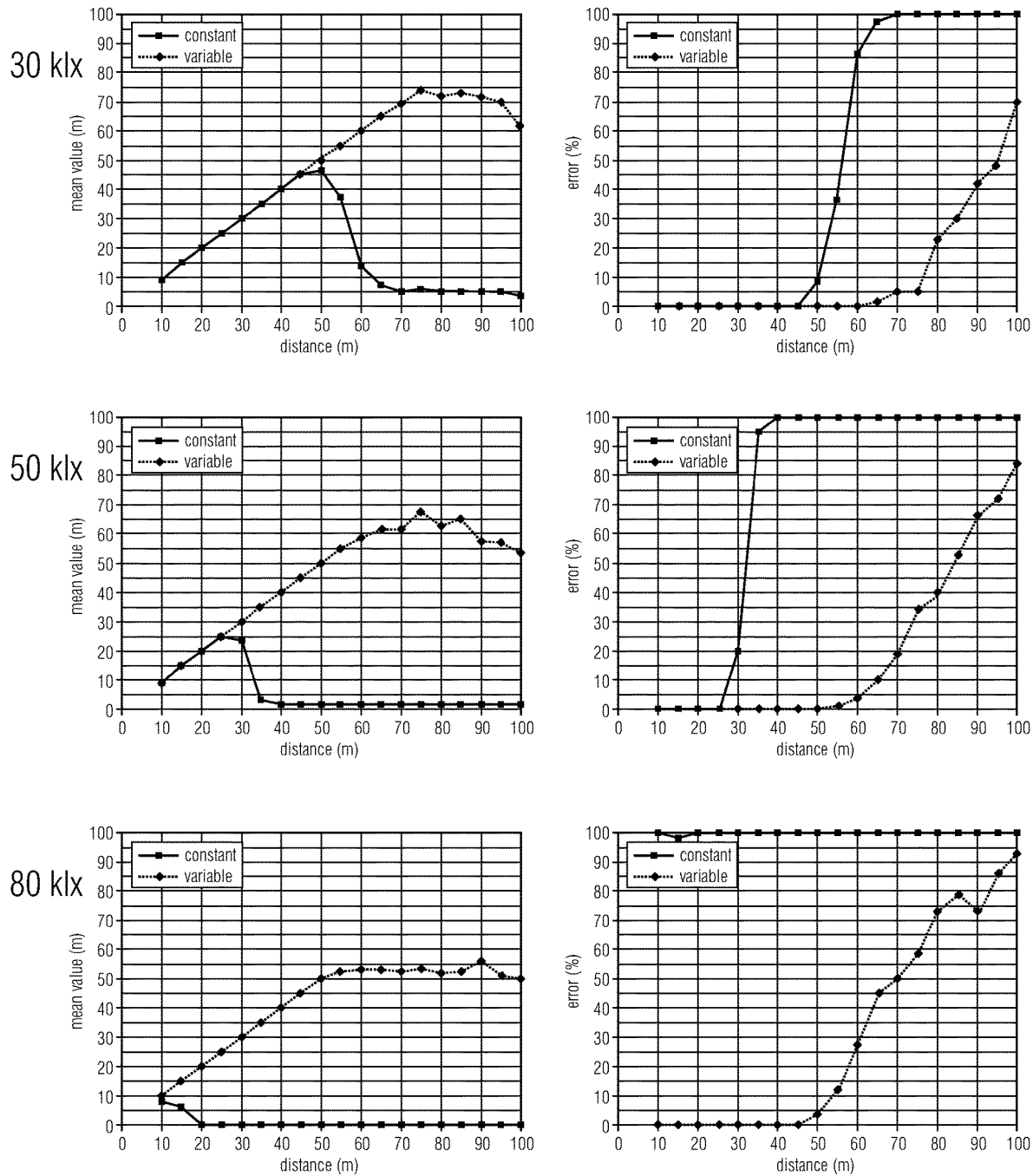
FIG. 12 shows exemplary mean values and error probabilities for distance measurements with constant coincidence time and with monotonically increasing coincidence time for different background illumination levels.

FIGS. 10, 11 and 12 show a comparison of the inventive method and conventional technology by means of a simulation.

In order to compare the method presented with conventional technology, the direct measuring method is simulated. For this purpose, an optical sensor 3 having a detection unit 4 (sensor pixel 4), which includes four detectors 11, is simulated, each detector 11 generating events at a rate of R/4. Simulation of the events is effected by means of exponentially distributed random variables according to (2). From the events of the individual detectors 11, the coincidence events for the defined coincidence depth KOT and coincidence time KOZ are determined in the further course. Simulation is effected with a constant coincidence time KOZ as well as with a variable coincidence time KOZ according to (11). For evaluating the quality, the mean value is calculated according to $$\bar{d} = \frac{1}{N}\sum_{i=1}^{N} d_i \quad (20)$$

with the measured distance DIS of the $i^{th}$ measurement $d_i$ and the total number of measurements N as well as the error probability from N=200 individual measurements with $N_{cycle}$=400 individual time measurements, respectively, for each distance point. The error probability is defined as the probability that the distance measured deviates from the actual distance by more than 3%. Thus, the following applies:

$$P_{Err} = \frac{1}{N}\sum_{i=1}^{N} x_i \text{ with} \quad (21)$$

-continued
$$x_i = \begin{cases} 0 & \text{for } |d_i - d_{true}|/d_{true} \leq 0.03 \\ 1 & \text{else} \end{cases}$$

with the actual distance $d_{true}$.

FIG. 10 shows exemplary mean values and error probabilities for distance measurements with a constant coincidence time KOZ for different background illumination levels in kilolux (klx) for different reflectances of the respective object OBJ.

FIG. 11 shows exemplary mean values and error probabilities for distance measurements with monotonically increasing coincidence time KOZ for different background illumination levels in kilolux (klx) for different reflectances of the respective object OBJ.

FIGS. 10 and 11 show the mean value according to (20) and the error probability according to (21) for background intensities of 30 klx, 50 klx and 80 klx as well as for reflection coefficients of 5% to 95% for constant and variable coincidence times KOZ at a constant coincidence depth KOT of n=2. The background event rate may be determined from the intensity by means of the system parameters selected. With an intensity of 100 klx and a reflectance of 100%, a rate of $R_B$=108.96 MHz results. For the event rate of the laser pulse, a value of $R_A$=1863 MHz results at a distance of d=10 m for a reflectance of 100%. For the simulations, a pulse duration of 16 ns was assumed, which at the same time corresponds to the constant coincidence time KOZ in the event of stimulation without variable coincidence time KOZ and to the maximum value $\vartheta_{max}$ of the coincidence time KOZ with a variation according to (11). Depending on the background intensity, a different minimum value $\vartheta_{min}$ may be used for the coincidence time KOZ in order to enable a constant probability density function for the background portion. From the condition according to (19), said minimum value $\vartheta_{min}$ may be determined to be 1324 ps, 504 ps and 200 ps for 30 klx, 50 klx and 80 klx.

FIG. 12 shows exemplary mean values and error probabilities for distance measurements with a constant coincidence time KOZ and with a monotonically increasing coincidence time KOZ for different background illumination levels.

If one compares the curves for constant and variable coincidence times KOZ, an increase in the range may be found for mean and high reflection coefficients and/or background event rates when the method presented is employed. With a constant coincidence time, high rates ensure that due to the form of the probability density function WDS according to FIG. 2, the maximum of the histogram will be found at distances which are close to zero. Consequently, the curves of the mean value bend downward and tend toward zero as soon as the reflected signal pulse can no longer be reliably found. In the event of a variable coincidence time KOZ, the maxima are approximately equally distributed (i.e., P(t)=1/T for 0≤t≤T) due to the probability density function WKS according to FIG. 7 when the signal pulse is not detected, as a result of which the mean value tends toward the mean system range ($\int_0^T P(t)t\,dt = \int_0^T t/T\,dt = T/2$). In the simulations shown, said mean system range is at 50 m. In order to make a quantitative statement regarding the range gain, a criterion for the maximum range may be defined. By way of example, a maximum error probability of 10% is to define the maximum range. With a constant coincidence time, one therefore obtains a maximum range at a reflectance of 50% of 50 m, 27 m and <10 m for background intensities of 30 klx, 50 klx, and 80 klx. By using variable coincidence, however, ranges of 75 m, 65 m and 54 m may be achieved. For clarity's sake, the curves of the values mentioned are once again presented separately in FIG. 5.

As was discussed at the outset, simulation of the method of the increasing coincidence time KOZ thus clearly proves the gain in robustness of the maximum range for high background light intensities. For a constant coincidence time KOZ, the range drops to below 10 m at 80 klx; however, it drops to only 54 m with increasing coincidence time KOZ. Overall, the range drops from 50 m to below 10 m—i.e., by more than 80%—with a constant coincidence time KOZ when the background light intensity increases from 30 klx to 80 klx; however, it drops from 75 m to 54 m, i.e., by less than 30%, with an increasing coincidence time KOZ.

Figure 13:
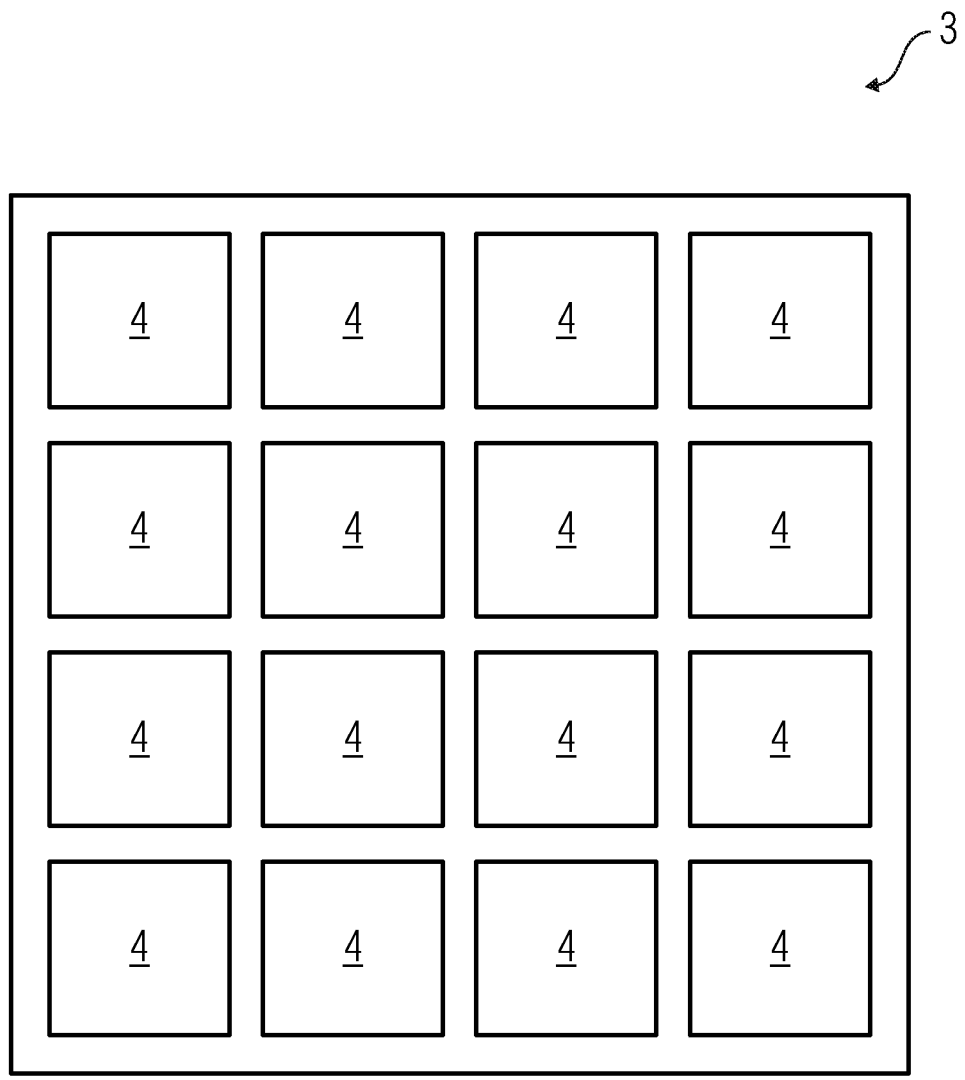
FIG. 13 shows an exemplary optical sensor comprising a multitude of detection units in a schematic view.

FIG. 13 shows an exemplary optical sensor 3 having a plurality of detection units 4 in a schematic view.

In accordance with an advantageous further development of the invention, the optical sensor 3 comprises a multitude of detection units 4 which comprise different sensing areas.

The optical sensor 3 consists of several independent detection units 4 (pixels), so that a three-dimensional distance image may be captured. Each detection unit 4 may comprise several detectors 11.

Figure 14:
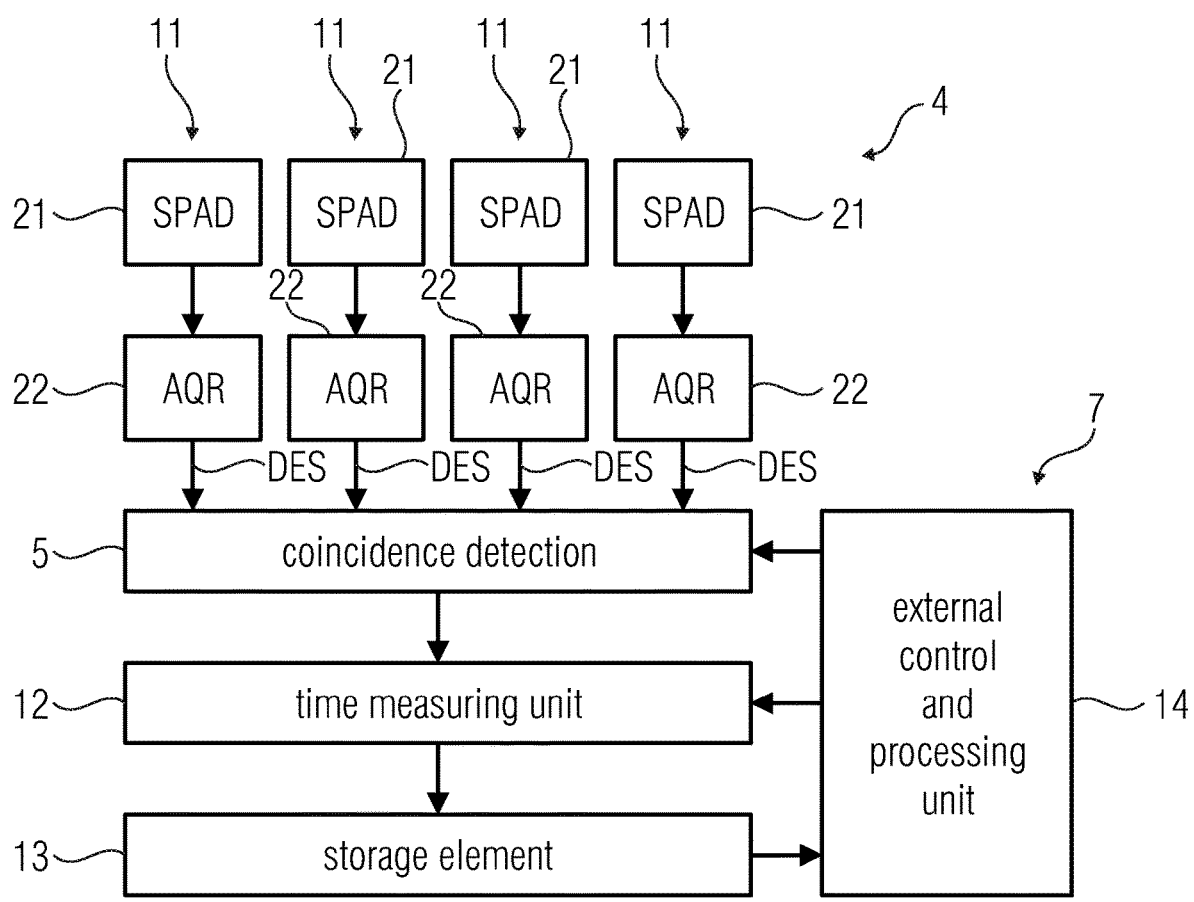
FIG. 14 shows, in a schematic representation, an exemplary detection unit comprising a multitude of detectors, the associated coincidence recognition stage as well as the associated travel-time measuring means.

In a schematic representation, FIG. 14 shows an exemplary detection unit 4 comprising a multitude of detectors 11, the associated coincidence recognition stage 5 as well as the associated travel-time measuring means 7.

In accordance with an expedient further development of the invention, the detection unit 4 comprises a multitude of detectors 11 for detecting individual photons PHO, the detectors 11 comprising mutually corresponding sensing areas, and the coincidence depth KOT being preset not to be larger than a number of detectors 11.

The detection unit 4 consists of several individual detectors 11. The detectors 11 each comprise a single-photon avalanche diode 21 since single-photon avalanche diodes are suitable for sensing individual photons PHO due to their high sensitivity and are therefore suitable for the method described. Each detector 11 of a detection unit 4 provides detection signals DES as soon as an incident photon PHO has been recognized. Following detection of a photon PHO, the detector 11 is inactive for the duration of the dead time, and it is only after this that a next photon PHO can be detected. In order to implement coincidence times that are shorter than the dead time, recognition of photon correlation therefore is effected by linking the detection signals DES of several detectors 11. In the present embodiment, four detectors 11 are used for each detection unit 4. Each of them has a separate circuit 22 for quenching the current following detection of a photon PHO and for resetting the detector 11 (Active Quenching and Reset, AQR). Said circuit 22 provides detection signals DES of the duration of the dead time, which are supplied to the coincidence recognition stage 5 for recognizing photon coincidence. Said coincidence recognition stage 5 recognizes whether at least a number of detection signals DES which corresponds to the preset coincidence depth KOT has been received within a defined coincidence time KOZ. If this condition is met, the coincidence recognition stage 5 generates a coincidence signal KOS. This signal is supplied to the travel-time measuring means 7, which comprises a time measuring unit 12, a storage means 13 and a control and processing unit 14. The time measuring unit 12 starts time measurement when the coincidence signal KOS is received. At the end of a defined measuring window, the time measurement of all detection units 4 is stopped in a synchronous manner, and the measured time value is stored in storage elements 13. From the storage elements 13, the data is read out at a given time and transferred to a control and processing unit 14. The latter will calculate, from several time marks, a time that is specific for each individual detection unit 4 and will then be transferred to the measured distance DIS.

In the embodiment, the coincidence detection unit 5 generates coincidence signals KOS from the detection signals DES of the detectors 11 of a detection unit 4. For this purpose, the duration of the detection signals DES is initially made to match the desired coincidence time KOZ by means of a pulse former. The coincidence time KOZ is dependent on the time that has passed since the beginning of the measurement, according to (11). The resulting detection signals DES with their adjusted durations are subsequently supplied to a logical operation. The latter will generate an output signal if at least a number of detection signals DES, which corresponds to the selected coincidence depth KOT, are applied. By using several logical operations for different coincidence depths KOT and by selecting one of the output signals by means of a multiplexer, it is possible to vary the coincidence depth KOT.

Figure 15:
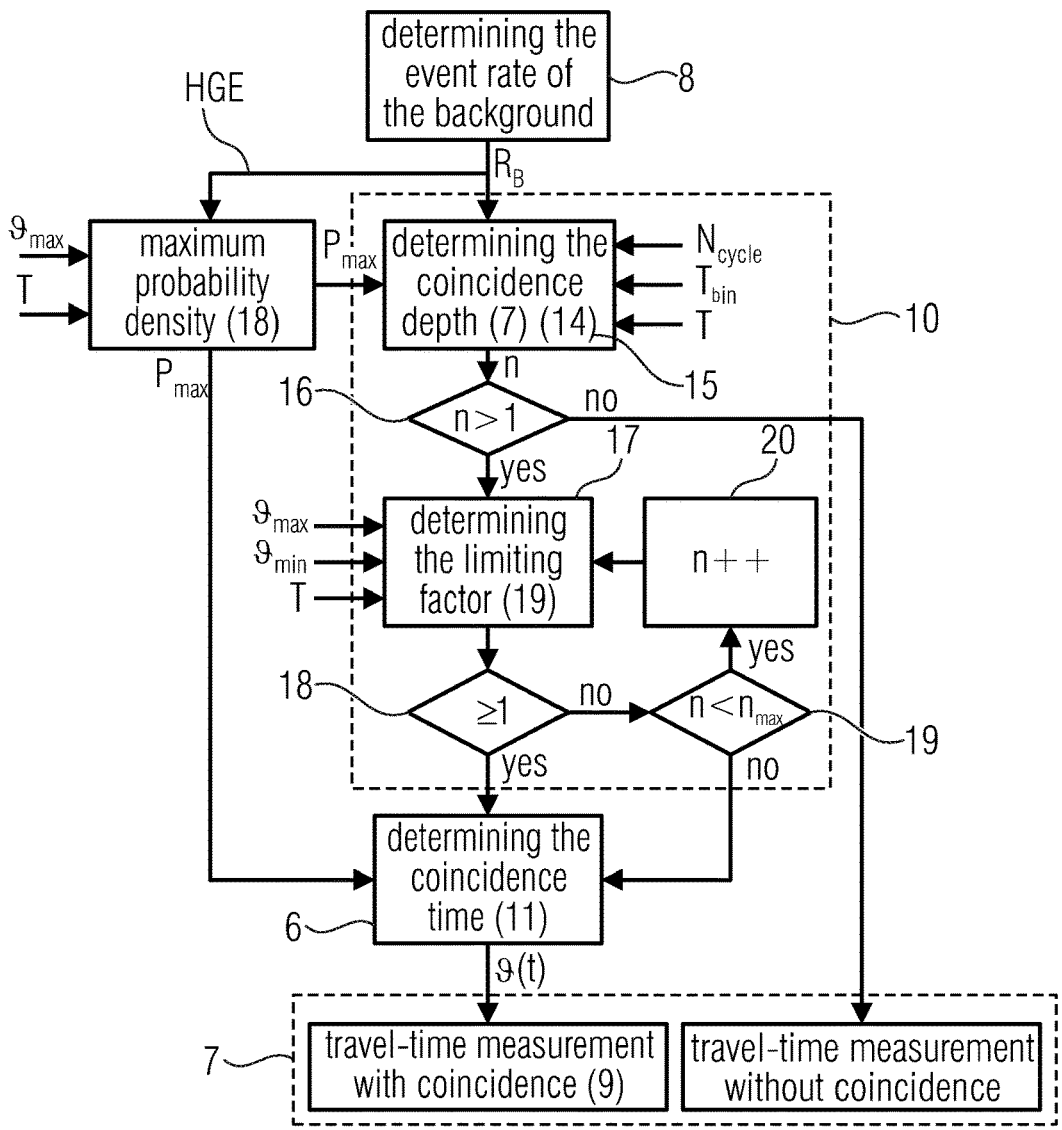
FIG. 15 shows a third embodiment of an inventive laser measuring means in a schematic partial representation.

FIG. 15 shows a third embodiment of an inventive laser measuring means in a schematic partial representation. The third embodiment is based on the second embodiment, so that merely the variations and supplements of the third embodiment will be explained below.

In accordance with an advantageous further development of the invention, the travel-time measuring means 1 is configured such that the distance DIS is determined on the basis of a travel-time measurement of the detection signals DES if the preset coincidence depth KOT is one, and such that the distance is determined on the basis of the travel-time measurement of the coincidence signals KOS if the preset coincidence depth KOT is larger than one.

FIG. 15 shows a flow chart of a possible algorithm for distance-dependent variation of the coincidence time of an inventive laser measuring means 1. In a first step, the background event rate HGE is determined by means of the background event rate determining stage 8. This may be effected by counting events within a defined time window without active coincidence or on the basis of the histogram of a previous distance measurement. For selecting the coincidence depth KOT, the signal/noise ratio SDS without coincidence, according to (7), as well as the signal/noise ratio SRV with coincidence, according to (14), are calculated for all available values n of by means of the signal/noise ratio determining stage 15 of the coincidence depth presetting stage 10. The quantities that may be used for this, specifically "number of cycles $N_{cycle}$," "width of the bins $T_{bin}$", and the "measurement duration T" are defined by the measuring system and are therefore known. For $P_{const}$, $P_{max}$ is used, according to (18), which can be calculated from the known quantities. The value $R_A$ is the event rate of the reflected laser pulse LAP. Since said value $R_A$ cannot be measured directly or determined from the histogram HIG, the case $R_A=R_B$ will be assumed here. This case is assumed as a worst case up to which measurement is possible. For higher intensities of the laser pulse LAP, the limiting values are shifted toward lower rates, so that the coincidence depth KOT specified tends to be too low rather than too high. Thus, one ensures that measurement is possible, even if one does not always achieve the optimum signal/noise ratio SRV. An alternative possibility is to estimate the event rate of the laser pulse LAP from the histogram HIG of a previous measurement, which involves a certain correlation of the measurements, however. If the specification of the coincidence depth KOT results in that a measurement without coincidence promises to yield the highest quality, the further steps are skipped by the first decision stage 16, and travel-time measurement without coincidence may be effected directly.

If it makes sense to use coincidence, it will be verified, by means of the limiting-factor determining stage 17, whether a constant probability density may be achieved with the available dynamic range of the coincidence time KOZ. To this end, the criterion according to (19) is verified. If the condition is not met, the coincidence depth KOT will be increased, by means of the incrementation stage 20, for such time until the criterion is met or until its maximum value $n_{max}$ is reached, said reaching of the maximum value $n_{max}$ being verified by the third decision stage 19. Subsequently, the coincidence time KOZ is determined by means of the coincidence time presetting stage 6 according to (11) while assuming $P_{const}=P_{max}$ prior to performing the travel-time measurement on the basis of the direct method. Depending on the system requirements and the target application, this process may be cycled through prior to any measuring cycle MZ, i.e., prior to any shot of the laser 2, prior to a group having a defined number of measuring cycles MZ, or merely prior to complete distance measurement consisting of a multitude of measuring cycles MZ.

Figure 16:
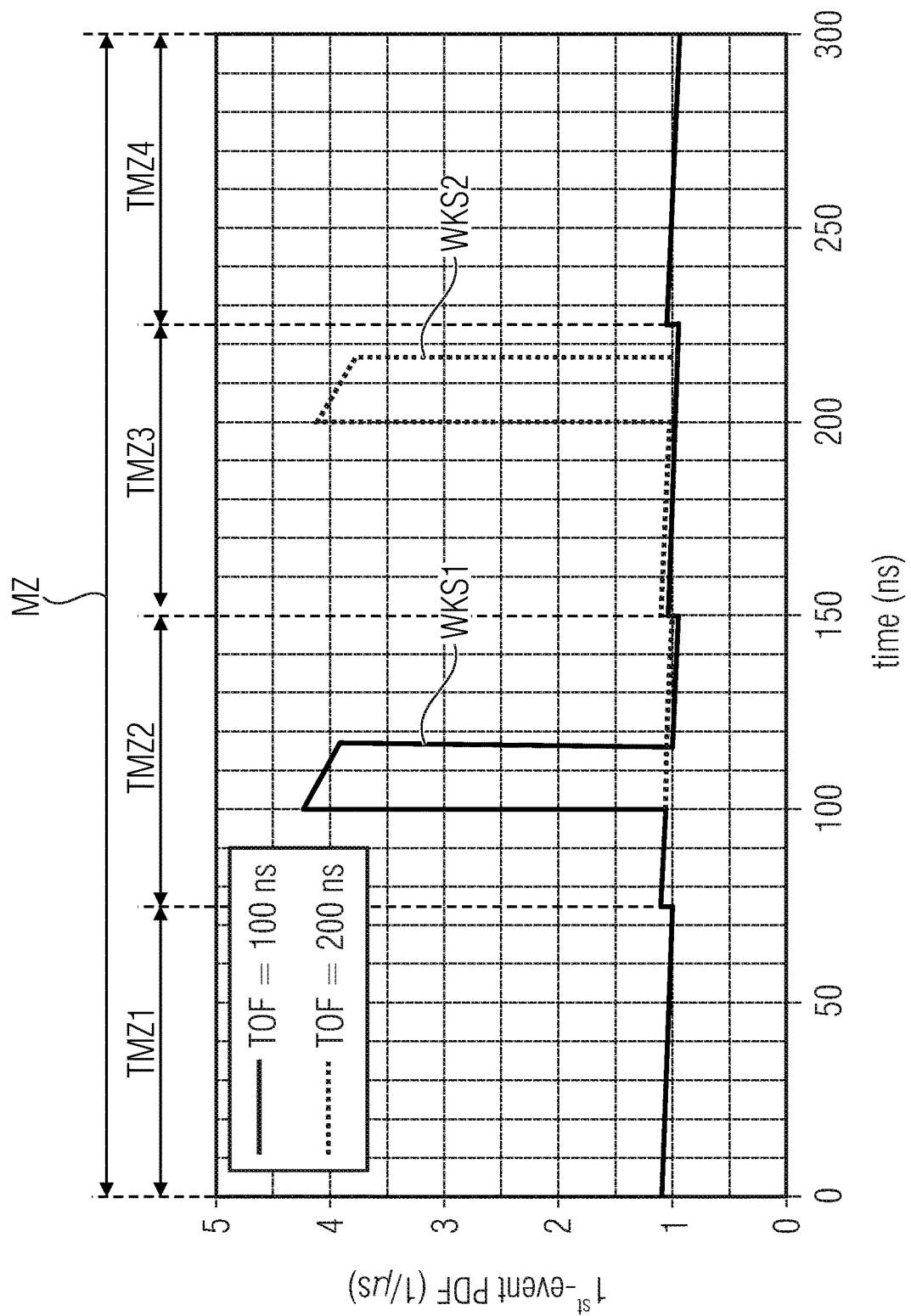
FIG. 16 shows exemplary probability density functions for the occurrence of a first coincidence signal for different times of flight as a function of the travel time for a measuring cycle, the coincidence time being determined at the beginning of one of the partial measuring cycles, respectively, and being held constant for the respective partial measuring cycle.

FIG. 16 shows exemplary probability density functions for the occurrence of a first coincidence signal for different times of flight as a function of the travel time for a measuring cycle, the coincidence time KOZ each being determined at the beginning of one of the partial measuring cycles TMZ and being kept constant for the respective partial measuring cycle TMZ.

In accordance with an advantageous further development of the invention, the coincidence time presetting stage 6 is configured such that the measuring cycle MZ is subdivided into several partial measuring cycles TMZ, the coincidence time KOZ each being determined at the beginning of one of the partial measuring cycles TMZ and being kept constant for the respective partial measuring cycle TMZ.

The above-described progressive variation of the coincidence time KOZ as a function of the travel time places high demands on the hardware. An alternative variant presents variation of the coincidence time KOZ in fixed steps. The more steps are used, the larger the advantage of the method presented will be as compared to a fixed coincidence time KOZ. FIG. 16 shows the probability density functions WKS1 and WKS2 of the first event when the coincidence time KOZ is varied in four stages. The values of the coincidence time KOZ are calculated according to (11) for the times 0, T/4, T/2 and T3/4. Said values at the same time correspond to those points in time when the coincidence time KOZ is modified. As compared to the probability density functions WKS1 and WKS2 of FIG. 7, the probability density functions WKS1 and WKS2 of FIG. 16 exhibit only a marginal change. However, the expenditure in terms of hardware is considerably reduced.

Aspects of the invention which have been described within the context of a device also relate to corresponding methods. Conversely, such aspects of the invention which have been described within the context of a method also relate to a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

SOURCES

[1] P. Seitz and A. J. P. Theuwissen, Eds., Single-photon imaging. Heidelberg; New York: Springer, 2011.

[2] M. M. Hayat, S. N. Torres, and L. M. Pedrotti, "Theory of photon coincidence statistics in photon-correlated beams," Opt. Commun., Vol. 169, No. 1-6, pp. 275-287, October 1999.

[3] M. Beer, O. M. Schrey, B. J. Hosticka, and R. Kokozinski, "Coincidence in SPAD-based time-of-flight sensors," in 2017 13th Conference on Ph.D. Research in Microelectronics and Electronics (PRIME), 2017, pp. 381-384.

The invention claimed is:

1. Laser measuring device for measuring a distance from an object, comprising:
a pulse laser for emitting a laser pulse at the beginning of a measuring cycle;
an optical sensor comprising at least one detection unit for generating detection signals, the detection unit comprising at least one detector for detecting individual photons, the detection unit generating one of the detection signals, during the measuring cycle, each time one of the photons is detected by the detector;
a coincidence recognition stage for generating coincidence signals, wherein during the measuring cycle, one of the coincidence signals is generated each time the detection signals generated by the detection unit reach at least a preset coincidence depth within a coincidence time;
a coincidence time presetting stage for presetting the coincidence time for the coincidence recognition stage, the coincidence time presetting stage being configured such that the coincidence time monotonically increases during the measuring cycle; and
travel-time measuring device for determining the distance based on a travel-time measurement of the coincidence signals.

2. Laser measuring device as claimed in claim 1, the laser measuring device comprising a background event rate determining stage for determining a background event rate of the detection signals, the coincidence time presetting stage being configured to preset the coincidence time based on the background event rate.

3. Laser measuring device as claimed in claim 1, wherein the coincidence time presetting stage is configured to preset the coincidence time based on the preset coincidence depth.

4. Laser measuring device as claimed in claim 1, the laser measuring device comprising a maximum value determining stage for determining a maximum value of a constant probability density function for the occurrence of a first coincidence signal of the coincidence signals when exclusively considering a background event rate of the detection signals at the preset coincidence depth, the coincidence time presetting stage being configured to preset the coincidence time based on the maximum value.

5. Laser measuring device as claimed in claim 1, the laser measuring device comprising a background event rate determining stage for determining a background event rate of the detection signals, the laser measuring device comprising a coincidence depth presetting stage for presetting the coincidence depth for the coincidence recognition stage, and the coincidence depth presetting stage being configured to preset the coincidence depth based on the background event rate.

6. Laser measuring device as claimed in claim 5, wherein the coincidence depth presetting stage is configured to determine signal/noise ratios of probability density functions for the occurrence of a first coincidence signal of the coincidence signals at different values for the coincidence depth, each of the different values having one of the signal/noise ratios determined for it; that value of the different values which is associated with a maximum signal/noise ratio of the signal/noise ratios is preset as the coincidence depth.

7. Laser measuring device as claimed in claim 5, wherein the coincidence depth presetting stage is configured such that the coincidence depth is constant during the measuring cycle.

8. Laser measuring device as claimed in claim 1, wherein the coincidence time presetting stage is configured such that the coincidence time strictly monotonically increases during the measuring cycle.

9. Laser measuring device as claimed in claim 1, wherein the coincidence time presetting stage is configured such that the coincidence time is preset, during the measuring cycle, such that a probability density function for the occurrence of a first coincidence signal of the coincidence signals deviates by a maximum of 10% from a constant value during the measuring cycle when one exclusively considers a background event rate of the detection signals.

10. Laser measuring device as claimed in claim 1, wherein the coincidence time presetting stage is configured such that the measuring cycle is subdivided into several partial measuring cycles, the coincidence time being determined at the beginning of one of the partial measuring cycles, respectively, and being held constant for the respective partial measuring cycle.

11. Laser measuring device as claimed in claim 1, wherein the detection unit comprises a multitude of detectors for detecting individual photons, the detectors comprising mutually corresponding sensing areas, and the coincidence depth being preset not to be larger than a number of the detectors.

12. Laser measuring device as claimed in claim 1, wherein the optical sensor comprises a multitude of detection units which comprise different sensing areas.

13. Laser measuring device as claimed in claim 1, wherein the travel-time measuring device is configured such that the distance is determined on the basis of a travel-time measurement of the detection signals when the preset coincidence depth is one, and such that the distance is determined on the basis of the travel-time measurement of the coincidence signals when the preset coincidence depth is larger than one.

14. Method of operating a laser measuring device for measuring a distance from an object, the method comprising:
emitting a laser pulse at the beginning of a measuring cycle by means of a pulse laser;
generating detection signals by means of at least one detection unit of an optical sensor, the detection unit comprising at least one detector for detecting individual photons, wherein during the measuring cycle, one of the detection signals is generated by the detection unit each time one of the photons is detected by the detector;
generating coincidence signals by means of a coincidence recognition stage, wherein during the measuring cycle, one of the coincidence signals is generated each time the detection signals generated by the detection unit reach at least a preset coincidence depth within a coincidence time;
presetting the coincidence time for the coincidence recognition stage by a coincidence time presetting stage, the coincidence time being preset such that the coincidence time monotonically increases during the measuring cycle; and
determining the distance by means of a travel-time measuring device on the basis of a travel-time measurement of the coincidence signals.

15. A non-transitory digital storage medium having a computer program stored thereon to perform the method of operating a laser measuring device for measuring a distance from an object, said method comprising:
emitting a laser pulse at the beginning of a measuring cycle by means of a pulse laser;
generating detection signals by means of at least one detection unit of an optical sensor, the detection unit comprising at least one detector for detecting individual photons, wherein during the measuring cycle, one of the detection signals is generated by the detection unit each time one of the photons is detected by the detector;
generating coincidence signals by means of a coincidence recognition stage, wherein during the measuring cycle, one of the coincidence signals is generated each time the detection signals generated by the detection unit reach at least a preset coincidence depth within a coincidence time;
presetting the coincidence time for the coincidence recognition stage by a coincidence time presetting stage, the coincidence time being preset such that the coincidence time monotonically increases during the measuring cycle; and
determining the distance by means of a travel-time measuring device on the basis of a travel-time measurement of the coincidence signals,
when said computer program is run by a computer.

* * * * *